(12) United States Patent
Yamazaki et al.

(10) Patent No.: US 7,339,305 B2
(45) Date of Patent: Mar. 4, 2008

(54) PIEZOELECTRIC ACTUATOR DRIVE APPARATUS, ELECTRONIC DEVICE, DRIVING METHOD THEREOF, DRIVE CONTROL PROGRAM THEREOF, AND STORAGE MEDIUM IN WHICH PROGRAM IS STORED

(75) Inventors: Yutaka Yamazaki, Suwa (JP); Takashi Kawaguchi, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 518 days.

(21) Appl. No.: 11/081,673

(22) Filed: Mar. 17, 2005

(65) Prior Publication Data

US 2005/0231069 A1    Oct. 20, 2005

(30) Foreign Application Priority Data

Mar. 17, 2004    (JP)    ............................. 2004-076507

(51) Int. Cl.
*H01L 41/08*    (2006.01)
(52) U.S. Cl. ................................................. 310/316.01
(58) Field of Classification Search ................ 310/316, 310/317, 328; *H01L 41/08*
See application file for complete search history.

(56) References Cited

U.S. PATENT DOCUMENTS

| | | | | |
|---|---|---|---|---|
| 5,001,442 A | * | 3/1991 | Hanaie et al. | ......... 310/316.01 |
| 5,436,521 A | * | 7/1995 | Kataoka | ...................... 310/317 |
| 5,495,152 A | * | 2/1996 | Fukui | ..................... 310/316.02 |
| 6,100,622 A | * | 8/2000 | Yamamoto et al. | ..... 310/316.01 |

FOREIGN PATENT DOCUMENTS

JP        H05-184171 A        7/1993

* cited by examiner

*Primary Examiner*—Darren Schuberg
*Assistant Examiner*—Karen Beth Addison
(74) *Attorney, Agent, or Firm*—Global IP Counselors, LLP

(57) ABSTRACT

The control circuit (131) causes drive frequency modification to be re-executed after returning the drive frequency to the prescribed drive frequency when the reduction rate of the power source voltage is higher than the standard reduction rate; specifically, when driving is being performed at a drive frequency whereby drive efficiency is poor and power consumption is high, or when the piezoelectric actuator A cannot start up for whatever reason. Therefore, since a startup failure or the like can be immediately determined based on the reduction rate of the power source voltage without a long time elapsing before the startup failure is detected, the time required for this determination can be shortened, the processing that is performed from the detection of an abnormality until optimization of the drive signal can be quickly executed, electrical power consumption can be reduced, and low-power operation can be ensured.

10 Claims, 11 Drawing Sheets

PIEZOELECTRIC ACTUATOR DRIVE APPARATUS, ELECTRONIC DEVICE, DRIVING METHOD THEREOF, DRIVE CONTROL PROGRAM THEREOF, AND STORAGE MEDIUM IN WHICH PROGRAM IS STORED

FIELD OF THE INVENTION

The present invention relates to a piezoelectric actuator drive apparatus, to an electronic device, to a driving method for the electronic device, to a drive control program for the electronic device, and to a storage medium in which the program is stored.

DESCRIPTION OF THE RELATED ART

Piezoelectric elements have excellent efficiency or response in converting electrical energy to mechanical energy. Various types of piezoelectric actuators have therefore been developed in recent years that utilize the piezoelectric effects of a piezoelectric element.

These piezoelectric actuators have as their primary constituent element a vibrating body having a piezoelectric element, wherein the vibrating body is composed, for example, of a plate-shaped reinforcing plate having a protrusion that contacts a driven body on one end thereof, piezoelectric elements affixed to both sides of the reinforcing plate, drive electrodes provided on the surfaces of these piezoelectric elements, and detection electrodes that are electrically insulated from the drive electrodes. A drive apparatus for a piezoelectric actuator is also known whereby a prescribed alternating current is applied to the drive electrodes of the vibrating body, the vibrating body is excited by longitudinal vibration that causes it to expand and contract in the longitudinal direction, and flexural vibration is induced whereby the vibrating body oscillates in the direction orthogonal to the direction of the longitudinal vibration (see Prior Art 1, for example).

With the drive control performed by this type of drive apparatus, a piezoelectric actuator rotates so that the protrusion of the vibrating body traces an elliptical orbit, and drives the driven body that is in contact with the protrusion. An alternating current voltage having the optimum oscillation frequency according to design must be applied to the vibrating body of the piezoelectric actuator, and the prescribed longitudinal vibration and flexural vibration must be generated therein in order for the driven body to be driven at high efficiency. However, according to the circuit characteristics or temperature of the drive apparatus, its driving torque, and the like, it is difficult to continually apply the optimum drive frequency that the apparatus is designed for. Feedback control is therefore implemented in this drive apparatus whereby a detection signal from the detection electrodes provided to the piezoelectric elements is detected, and the drive frequency of the alternating current voltage applied to the drive electrodes is adjusted based on the detection signal.

Specifically, it is known that the phase contrast between the phase of the alternating current voltage applied to the drive electrodes and the phase of the detection signal detected from the detection electrodes, or the phase difference among the detection signals detected from a plurality of detection electrodes, is dependent upon the drive frequency of the alternating current voltage applied to the drive electrodes. The aforementioned phase difference corresponding to the optimum drive frequency for which the piezoelectric actuator was designed is therefore set in advance as the target phase difference, and the drive frequency of the alternating current voltage applied to the drive electrodes is adjusted so that the detected phase difference approaches the target phase difference set in advance. By implementing this type of feedback control, it becomes possible to apply an alternating current voltage having the optimum drive frequency for the vibrating body of the piezoelectric actuator, to cause the piezoelectric actuator to excite with the prescribed longitudinal and flexural vibration, and to drive the driven body at high efficiency.

However, since feedback control is performed based on the detection signal detected from the detection electrode in the drive apparatus of Prior Art 1, in such cases as when the piezoelectric actuator fails for some reason at drive initiation (startup), or when an abnormal drive state occurs during driving, a normal detection signal may not be obtained, and it can be impossible to appropriately adjust the drive frequency.

A drive control method capable of circumventing this type of situation and driving a piezoelectric actuator is known whereby the drive frequency of the drive signal is returned to its initial value when a failure in the piezoelectric actuator at startup or an abnormal driving state is detected, and the drive signal is applied while the drive frequency is continuously modified (sweep) until it goes from the initial value to the optimum drive frequency (see Prior Art 2, for example).

According to this drive control method, when it is detected that the body to be driven is not being driven at the time the piezoelectric actuator is activated, the drive frequency is returned to the high frequency that is the initial value thereof, and by re-sweeping the drive frequency towards a low frequency, it becomes possible to adjust the drive frequency of the drive signal to the optimum drive frequency.

[Prior Art 1]: International Unexamined Patent Application Publication No. 02-078165 Pamphlet

[Prior Art 2]: Japanese Patent No. 6-6990

SUMMARY OF THE INVENTION

However, in the drive control method of Prior Art 2, the determination as to whether the piezoelectric actuator has been started up correctly is performed by detecting the driving of the driven body, and the application of a drive signal having a drive frequency at which drive efficiency is poor (not optimal) must therefore be continued until driving of the driven body is detected even if a failure has occurred at startup. Drawbacks therefore occur in that it takes time to determine whether to initiate a re-sweep, and a large quantity of electrical power is wasted when the piezoelectric actuator fails at startup.

An object of the present invention is to provide a piezoelectric actuator drive apparatus capable of optimizing the drive signal quickly using little power, and also to provide an electronic device, a driving method thereof, a drive control program thereof, and a storage medium in which the program is stored.

The drive apparatus for a piezoelectric actuator of the present invention is a piezoelectric actuator drive apparatus for driving a piezoelectric actuator having a vibrating body that vibrates due to the application of a drive signal having a prescribed drive frequency to a piezoelectric element, and as a main feature thereof, comprises driving means for supplying the drive signal to the piezoelectric element of the vibrating body; vibration detection means for detecting the vibration of the vibrating body and outputting the detection signal thus detected; drive frequency modifying means for modifying the drive frequency of the drive signal so that the vibration state detected from the detection signal approaches the target vibration state; voltage detection means for detecting at least one of the power source voltage and the drive voltage of the piezoelectric actuator; and control means for causing drive frequency modification processing to be executed by the drive frequency modifying means whereby the drive frequency of the drive signal is increased or decreased from the prescribed drive frequency to become a modified drive frequency, and for causing the drive frequency modification processing to be re-executed after returning the drive frequency to the prescribed drive frequency based on the reduction rate of the voltage detected by the voltage detection means when this reduction rate is higher than a pre-set standard reduction rate.

The reduction rate of at least one of the power source voltage and the drive voltage of the piezoelectric actuator may be a rate that is computed based on the time from when modification processing for the drive frequency was started, or may be a rate computed based on the number of modifications in the modification processing. Specifically, the term "reduction rate" means the rate computed by dividing the amount by which the power source voltage or drive voltage is reduced by the time required for the reduction, or by the number of reductions.

The drive voltage of the piezoelectric actuator may be the same voltage as the power source voltage directly supplied from the power source, a voltage that is stepped up via a step-up circuit or the like provided between the power source and the piezoelectric actuator, or a voltage that is stepped down via a step-down circuit or the like.

According to the present invention, the piezoelectric actuator can be reactivated by an operation in which modification of the drive frequency is re-executed (re-sweep) after the drive frequency is returned to the prescribed value when the reduction rate of the power source voltage or drive voltage is higher than the standard reduction rate; specifically, when driving is performed at a drive frequency whereby drive efficiency is poor and power consumption is high, or when startup cannot be performed for some reason.

Therefore, in such a case as when the piezoelectric actuator fails to start up, since a startup failure can be quickly determined based on the reduction rate of the power source voltage or drive voltage without a long time elapsing before the startup failure is detected, as occurs in the case of the conventional drive control method, and the time required for this determination can be shortened, the processing that is performed from the detection of an abnormality until optimization of the drive signal can be quickly executed, electrical power consumption can be reduced, and low-power operation can be obtained.

The drive frequency of the drive signal can sometimes deviate from the optimum drive frequency due to some cause (temperature, drive torque, or the like) during driving, even when startup of the piezoelectric actuator is successful. In such a case, since the reduction rate of the power source voltage or drive voltage increases if the drive efficiency is significantly reduced by deviation from the optimum drive frequency, the piezoelectric actuator is reactivated by performing re-sweeping based on this reduction rate, and the drive signal can be adjusted to the optimum drive frequency.

In this regard, it is preferred in the piezoelectric actuator drive apparatus of the present invention that the standard reduction rate be set based on the startup time required by the piezoelectric actuator, and that the control means cause the drive frequency modifying means to execute the drive frequency modification processing based on at least one of the reduction rates of the power source voltage and the drive voltage of the piezoelectric actuator at the time at which driving of the piezoelectric actuator is initiated.

The startup time required by the piezoelectric actuator in this arrangement is the time elapsed from when the drive signal is applied to the piezoelectric actuator until the driven body begins to be driven (begins to rotate), and this startup time can be set in advance based on testing, experimentation, or the like.

The startup time may also be defined as the time until the drive speed (rotational speed or the like) required by design is reached according to the individual vibration characteristics of the piezoelectric actuator or the resistance exerted by the driven body (rotational torque and the like), and the standard reduction rate may be set based on the startup time thus defined. Furthermore, the startup time may also be defined as the time until the driven body attains a prescribed vibration state (rotational speed or the like).

By this type of configuration, since the standard reduction rate is set based on the required startup time of the piezoelectric actuator, the success or failure of startup of the piezoelectric actuator can be determined with higher precision, and the time required until re-sweeping when startup fails can be further shortened.

Furthermore, when the startup time of the piezoelectric actuator is set to the time from application of the drive signal until the driven body begins to be driven, a situation in which a drive signal continues to be applied at a frequency at which driving is not initiated can be avoided, and power consumption can be further minimized even when there is a sharp decrease in the power source voltage or drive voltage.

It is preferred in the piezoelectric actuator drive apparatus of the present invention that the drive frequency modifying means have phase difference detection means for detecting the phase difference between the drive signal and the detection signal, and comparison means for comparing the phase difference with a pre-set target phase difference, and that the drive frequency of the drive signal be modified so that the phase difference approaches the target phase difference based on the results of the comparison.

With this type of configuration, the drive frequency can be modified quickly since feedback control is performed by the drive frequency modifying means based on the comparison between the phase difference detected by the phase difference detection means and the target phase difference. Specifically, as described above, it is known that the phase difference between the drive signal and the detection signal is dependent upon the drive frequency of the drive voltage, and this dependency changes from a large phase difference (near 180°, for example) to a small phase difference (near 0°, for example) in the drive frequency region that straddles the resonance frequency. Therefore, whether to increase or decrease the drive frequency can be immediately determined from the size difference between the phase difference and the target phase difference, and control can be performed more rapidly.

In this regard, it is preferred in the piezoelectric actuator drive apparatus of the present invention that the control means cause the drive frequency modifying means to initiate the drive frequency modification processing using a frequency higher than the frequency for obtaining the target vibration state as the initiation frequency.

In this arrangement, the frequency that is higher than the frequency for obtaining the target vibration state is a frequency that is higher than the optimum drive frequency, and when this high frequency is the initiation frequency, it is a frequency that can be appropriately set in the range whereby it can be adjusted to the optimum drive frequency even when error due to the effects of the characteristics or circuit characteristics of the piezoelectric actuator, its temperature and other operating conditions, and the like is considered in a case in which the frequency is caused to sweep in the downward direction from this initiation frequency.

With this type of configuration, the drive frequency can be adjusted to the optimum drive frequency while power consumption can be minimized by causing the drive frequency to decrease (sweep) towards a low frequency from the initiation frequency, which is a frequency higher than the frequency for obtaining the target vibration state. Specifically, it is known regarding a piezoelectric actuator that power consumption becomes severe at the resonance frequency, and that the drive efficiency is increased by driving at a drive frequency that is slightly higher than this resonance frequency. Therefore, although the resonance frequency is passed through in sweeping from a low frequency to a high frequency, since the resonance frequency is not passed through in sweeping from a high frequency to a low frequency, consumption of the power source can be better minimized by initiating the sweep from a high frequency.

It is also preferred in the piezoelectric actuator drive apparatus of the present invention that the control means have a timer for measuring the time until at least one of the power source voltage and the drive voltage of the piezoelectric actuator is lower than a pre-set drive stop voltage, and that the reduction rate be determined to be faster than the standard reduction rate when the time measured by the timer is shorter than a pre-set standard time.

By this type of configuration, the reduction rate of the power source voltage or drive voltage can be immediately computed, and whether to restart the piezoelectric actuator can be quickly determined from the relationship between the time measured by the timer until the voltage decreases below the drive stop voltage, and the power source voltage or the drive voltage and drive stop voltage detected by the voltage detection means.

It is also preferred in the piezoelectric actuator drive apparatus of the present invention that the drive frequency modifying means have an up-down counter, that the drive frequency of the drive signal be modified based on the counter value of this up-down counter, and that the control means reset the counter value of the up-down counter and cause drive frequency modification processing to be re-executed when it is determined that the reduction rate of at least one of the power source voltage and the drive voltage of the piezoelectric actuator is higher than the standard reduction rate.

A configuration may also be adopted whereby the drive frequency modifying means also has an integration circuit and modifies the drive frequency of the drive signal based on the output value of this integration circuit; and the control means resets the output value of the integration circuit and causes drive frequency modification processing to be re-executed when it is determined that the reduction rate of at least one of the power source voltage and the drive voltage of the piezoelectric actuator is higher than the standard reduction rate.

By these configurations, since the drive frequency of the drive signal is swept and the counter value (output value) is reset based on the counter value of the up-down counter or the output value of the integration circuit, the drive frequency can be returned to the prescribed drive frequency that is its initial value, the piezoelectric actuator can be restarted, drive control can easily be performed, and the structure of the control circuit and the like can be simplified.

A feature of the electronic device of the present invention is that it is provided with any of the aforementioned piezoelectric actuator drive apparatuses, a piezoelectric actuator driven by the same, and a power source.

The electronic device of the present invention in this case is preferably a clock unit provided with a date display mechanism (driven unit) driven by the piezoelectric actuator.

By this type of configuration, the same effects as those described previously can be obtained, and size and profile reduction of the electronic clock can be advanced by using the piezoelectric actuator in driving the date display mechanism. Since the date display mechanism driven by the piezoelectric actuator is driven for a limited time within one day, rather than being continuously driven all the time, and may be driven a prescribed amount (amount of rotation), the drive control of the present invention is used so as to be capable of appropriately driving the piezoelectric actuator when driving is initiated.

Since the cell or secondary battery that is the power source is limited in size (capacity) in a wristwatch or other portable electronic clock, ability to minimize power consumption represents a significant advantage. Particularly, since the power source voltage or the drive voltage of the piezoelectric actuator is prone to decrease at the end of discharge by a secondary battery, driving of the piezoelectric actuator can be reliably performed by performing restarting based on the reduction rate of the voltage.

The driving method for the electronic device of the present invention is an electronic device driving method for driving an electronic device provided with a piezoelectric actuator having a vibrating body that vibrates due to the application of a drive signal having a prescribed drive frequency to a piezoelectric element; and a power source for supplying electrical power to the piezoelectric element of the vibrating body; wherein the driving method comprises a vibration detection step for detecting the vibration of the vibrating body and outputting the detection signal thus detected; a voltage detection step for detecting at least one of the power source voltage and the drive voltage of the piezoelectric actuator; a drive frequency modifying step for increasing or reducing the drive frequency of the drive signal from the prescribed drive frequency so that the vibration state of the vibrating body detected from the detection signal approaches the target vibration state; and a control step for causing the drive frequency modifying step to be re-executed after returning the drive frequency to the prescribed drive frequency based on the reduction rate of the voltage detected in the voltage detection step when this reduction rate is higher than a pre-set standard reduction rate.

Furthermore, a driving method for driving an electronic device provided with a piezoelectric actuator having a vibrating body that vibrates due to the application of a drive signal having a prescribed drive frequency to a piezoelectric element using driving means for supplying the drive signal to the piezoelectric element of the vibrating body may also be employed as the piezoelectric actuator driving method; wherein the driving method comprises a vibration detection step for detecting the vibration of the vibrating body and outputting the detection signal thus detected; a voltage detection step for detecting at least one of the power source voltage and the drive voltage of the piezoelectric actuator; a drive frequency modifying step for increasing or reducing the drive frequency of the drive signal from the prescribed drive frequency so that the vibration state of the vibrating body detected from the detection signal approaches the target vibration state; and a control step for causing the drive frequency modifying step to be re-executed after returning the drive frequency to the prescribed drive frequency based on the reduction rate of the voltage detected in the voltage detection step when this reduction rate is higher than a pre-set standard reduction rate.

According to the present invention, as in the case of the drive apparatus previously mentioned, the processing that is performed from the detection of an abnormality until optimization of the drive signal can be quickly executed, electrical power consumption can be reduced, and low-power operation can be obtained.

A characteristic feature of the electronic device drive control program of the present invention is that it causes a computer built into an electronic device provided with a piezoelectric actuator having a vibrating body that vibrates due to the application of a drive signal having a prescribed drive frequency to a piezoelectric element and driven by electrical power from a power source to function as at least one of: driving means for supplying the drive signal to the piezoelectric element of the vibrating body; vibration detection means for detecting the vibration of the vibrating body and outputting the detection signal thus detected; drive frequency modifying means for modifying the drive frequency of the drive signal so that the vibration state detected from the detection signal approaches the target vibration state; voltage detection means for detecting at least one of the power source voltage and the drive voltage of the piezoelectric actuator; and control means for causing drive frequency modification processing to be executed by the drive frequency modifying means whereby the drive frequency of the drive signal is increased or decreased from the prescribed drive frequency to become a modified drive frequency, and for causing the drive frequency modification processing to be re-executed after returning the drive frequency to the prescribed drive frequency based on the reduction rate of the voltage detected by the voltage detection means when this reduction rate is higher than a pre-set standard reduction rate.

Furthermore, a piezoelectric actuator drive control program may also be employed as a program whereby a computer built into an electronic device that is provided with a piezoelectric actuator having a vibrating body that vibrates due to the application of a drive signal having a prescribed drive frequency to a piezoelectric element and that is driven by electrical power from a power source is caused to function as at least the control means from among: driving means for supplying the drive signal to the piezoelectric element of the vibrating body; vibration detection means for detecting the vibration of the vibrating body and outputting the detection signal thus detected; drive frequency modifying means for modifying the drive frequency of the drive signal so that the vibration state of the vibrating body detected from the detection signal approaches the target vibration state; voltage detection means for detecting at least one of the power source voltage and the drive voltage of the piezoelectric actuator; and control means for causing drive frequency modification processing to be executed by the drive frequency modifying means whereby the drive frequency of the drive signal is increased or decreased from the prescribed drive frequency to become a modified drive frequency, and for causing the drive frequency modification processing to be re-executed after returning the drive frequency to the prescribed drive frequency based on the reduction rate of the voltage detected by the voltage detection means when this reduction rate is higher than a pre-set standard reduction rate.

According to the present invention configured such as described above, since a computer is caused to function as some or all of the driving means, vibration detection means, phase difference detection means, drive frequency modifying means, voltage detection means, and control means that constitute the drive control means of the electronic device, the processing that is performed from the detection of an abnormality until optimization of the drive signal can be quickly executed, electrical power consumption can be reduced, and low-power operation can be obtained as in the case of the drive apparatus previously mentioned.

The recording medium of the present invention is preferably one in which the electronic device drive control program or the piezoelectric actuator drive control program is recorded in a form that is readable by a computer.

By this type of configuration, the program can easily be read by a computer and updated even when the drive control program for the piezoelectric actuator or electronic device is modified or upgraded.

EFFECT OF THE INVENTION

With the present invention described above, it is possible to provide a piezoelectric actuator drive apparatus capable of optimizing the drive signal quickly using little power, and also to provide an electronic device, a driving method thereof, a drive control program thereof, and a storage medium in which the program is stored.

KEY TO SYMBOLS

1: electronic clock (electronic device); 9: secondary battery (power source); 10: date display mechanism; 12: vibrating body; 100, 100A: drive control apparatus (drive control circuit); 110: driver; 120: drive frequency modifying means; 123: phase difference DC conversion circuit (phase difference detection means); 124: phase difference comparison circuit (comparison means); 126: up-down counter; 130: control means; 131: control circuit; 132: timer; A: piezoelectric actuator; 160: driving means; 300: driven unit; 400: clock unit.

DESCRIPTION OF THE PREFERRED EMBODIMENTS

Embodiments of the present invention will be described hereinafter with reference to the drawings. As is clear from the disclosure of the present invention to one skilled in the art, the description relating to working examples of the present invention is given only for the purpose of describing the present invention, and shall not be construed as limiting the present invention as defined within the scope of the claims described hereinafter, or within an equivalent range.

1. First Embodiment

A first embodiment of the present invention will be described hereinafter based on the drawings.

The same symbols are used below from the description of the second embodiment onward to refer to components that are the same as those described in the first embodiment below, and for components that have the same functions as those in the first embodiment, and description thereof is simplified or omitted.

[1-1. Overall Structure]

Figure 1:
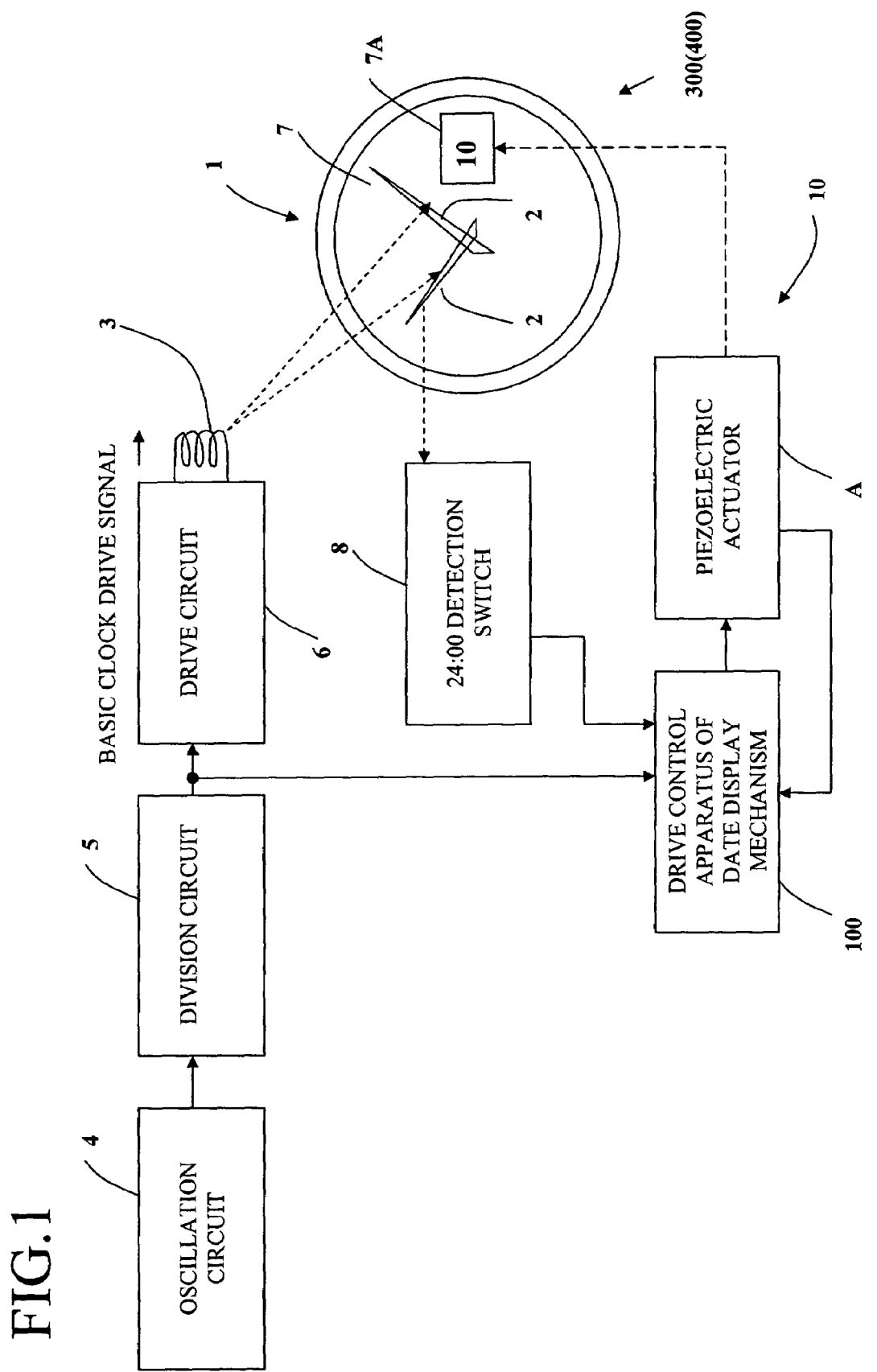
FIG. 1 is a diagram showing a schematic structure of the electronic device according to a first embodiment of the present invention.
Figure 2:
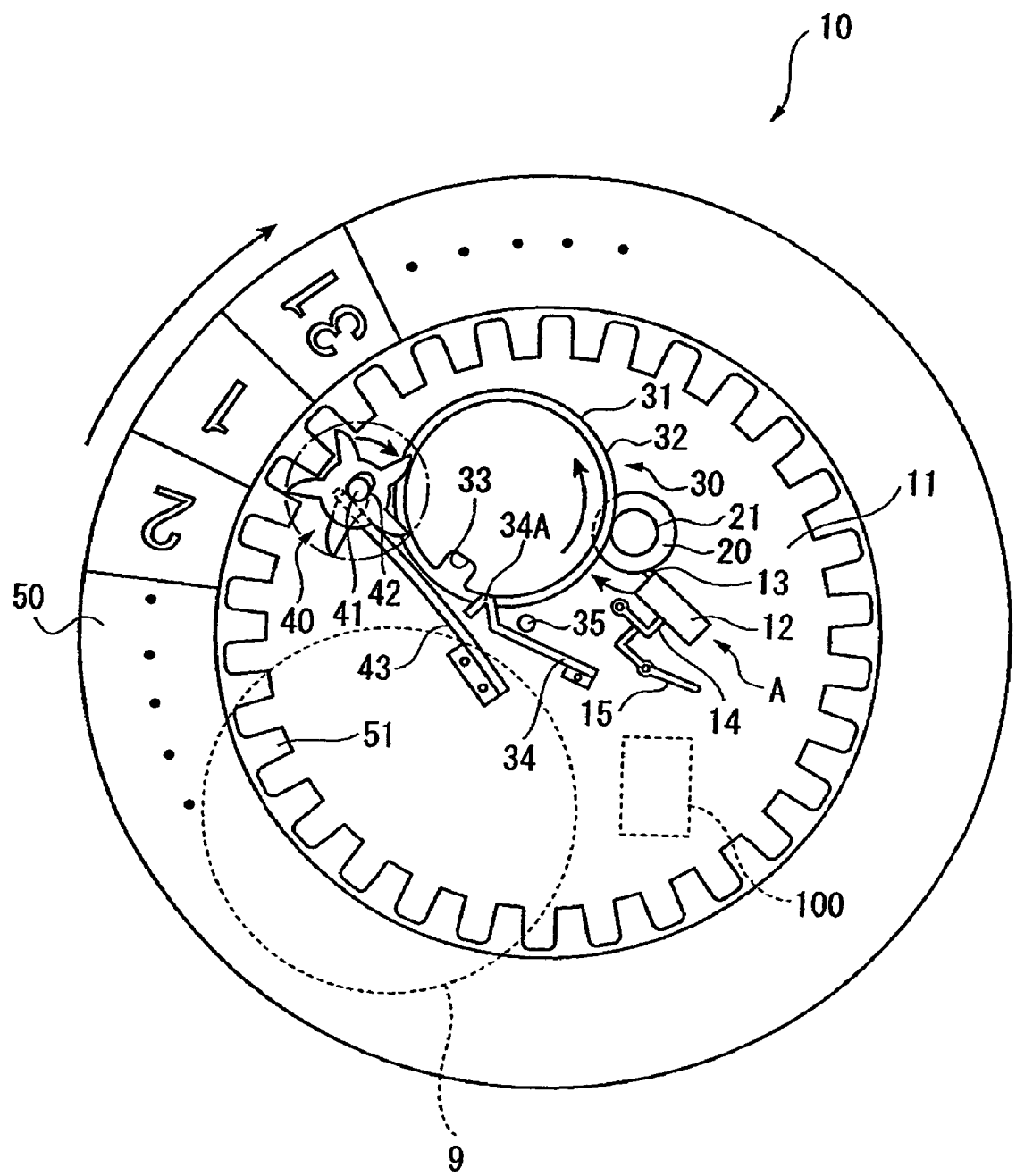
FIG. 2 is a plan view showing the detailed structure of the date display mechanism in the electronic device.

FIG. 1 is a diagram showing the schematic structure of the electronic clock 1 as the electronic device in the present embodiment. FIG. 2 is a plan view showing the detailed structure of the date display mechanism 10 in the electronic clock 1.

As shown in FIG. 1, the electronic clock 1 is a wristwatch provided with a pointer 2 for indicating the time, and a stepping motor 3 for driving the pointer 2. The driving of the stepping motor 3 is controlled by an oscillation circuit 4, a division circuit 5, and a drive circuit 6. The oscillation circuit 4 has a reference oscillation source composed of a quartz oscillator, and outputs a reference pulse. The reference pulse outputted from the oscillation circuit 4 is inputted to the division circuit 5, which generates a reference signal (a signal of 1 Hz, for example) based on the reference pulse. The drive circuit 6 generates a motor drive pulse for driving the stepping motor 3 based on the reference signal outputted from the division circuit 5.

The date display mechanism 10 of the electronic clock 1 is provided with a piezoelectric actuator A and a drive control apparatus 100 for performing drive control of the piezoelectric actuator A. This drive control apparatus 100 is configured so as to detect the time (24:00, for example) of the electronic clock 1, operate a switch 8 for opening and closing as a trigger, and drive the date display mechanism 10.

As shown in FIG. 2, the date display mechanism 10 is basically composed of the principal components that include the piezoelectric actuator A, a rotor 20 as an object (driven unit 300) rotationally driven by the piezoelectric actuator A, a reduction train wheel for transmitting while reducing the speed of rotation of the rotor 20, and a date indicator 50 rotated by the drive force transmitted via the reduction train wheel. The reduction train wheel is provided with an intermediate date wheel 30 and a date indicator driving wheel 40. The piezoelectric actuator A, the rotor 20, the intermediate date wheel 30, and the date indicator driving wheel 40 are supported by the bottom plate 11. The piezoelectric actuator A has a flat, strip-shaped vibrating body 12, and this vibrating body 12 is positioned so that the contacting portion 13 at the distal end thereof is in contact with the external peripheral surface of the rotor 20.

A disk-shaped dial 7 (FIG. 1) is provided over the date display mechanism 10. A window 7A for displaying the date is provided in a portion of the external periphery of the dial 7, and is configured so that the date on the date indicator 50 can be seen from the window 7A. A movement, secondary battery 9 as a power source, or other component for driving the pointer 2, connected to the stepping motor 3, is also provided under the bottom plate 11 (on the back side thereof). The secondary battery 9 is charged by a generator 9A (FIG. 4), and the battery supplies power to the stepping motor 3, the piezoelectric actuator A, or the circuits of the drive control apparatus 100. The generator 9A generates electric power using solar (sunlight) generation or the rotation of an oscillating weight, and feeds the power thus generated into the secondary battery 9. When a solar cell for generating direct-current power is used as the generator 9A herein, it is preferably connected to the secondary battery 9 via a backflow prevention circuit, and when an oscillating weight, power spring, or the like for generating alternating-current power is used as the generator 9A, it is preferably connected to the secondary battery 9 via a rectifying circuit.

The power source is not limited to a secondary battery 9 charged by a generator 9A, and may also be a common primary battery (a lithium ion cell, for example).

The intermediate date wheel 30 is composed of a large-diameter portion 31 and a small-diameter portion 32. The small-diameter portion 32 is a cylinder having a slightly smaller diameter than that of the large-diameter portion 31, and a substantially square notch 33 is formed in the external peripheral surface thereof. The small-diameter portion 32 is fixed so as to share the same center with respect to the large-diameter portion 31. A gear 21 on top of the rotor 20 meshes with the large-diameter portion 31. The intermediate date wheel 30 composed of the large-diameter portion 31 and the small-diameter portion 32 therefore rotates in coupling with the rotation of the rotor 20.

A leaf spring 34 is provided to the bottom plate 11 on the side of the intermediate date wheel 30, the base end of the leaf spring 34 is fixed to the bottom plate 11, and the distal end 34A thereof is folded into a substantial V shape. The distal end 34A of the leaf spring 34 is provided so as to be capable of entering and exiting the notch 33 of the intermediate date wheel 30. A terminal 35 is positioned in the vicinity of the leaf spring 34, and this terminal 35 is configured so as to come in contact with the leaf spring 34 when the intermediate date wheel 30 rotates and the distal end 34A of the leaf spring 34 enters the notch 33. A prescribed voltage is applied to the leaf spring 34, and this voltage is applied to the terminal 35 as well when the leaf spring comes in contact with the terminal 35. Therefore, by detecting the voltage of the terminal 35, the passing of a day can be detected, and one day's worth of rotation of the date indicator 50 can be detected. The configuration in which a leaf spring 34 or terminal 35 is used to detect the amount of rotation of the date indicator 50 is not limiting, and a configuration may also be adopted whereby the state of rotation of the rotor 20 or intermediate date wheel 30 is detected and a prescribed pulse signal is outputted, or another configuration. Specifically, publicly known photo-reflectors, photointerrupters, MR sensors, and various other types of rotation encoders and the like may be used.

The date indicator 50 has a ring shape, and an annular gear 51 is formed on the internal peripheral surface thereof. The date indicator driving wheel 40 has a five-toothed gear that meshes with the annular gear 51 of the date indicator 50. A shaft 41 is provided at the center of the date indicator driving wheel 40, and this shaft 41 is loosely fitted into a through-hole 42 formed in the bottom plate 11. The through-hole 42 is formed elongated in the circumferential direction of the date indicator 50. The date indicator driving wheel 40 and the shaft 41 are urged towards the upper right direction in FIG. 2 by a leaf spring 43 fixed to the bottom plate 11. The urging of the leaf spring 43 prevents the date indicator 50 from vibrating.

The vibrating body 12 of the piezoelectric actuator A is a rectangular plate having two long sides and two short sides. The vibrating body 12 has a layered structure in which a stainless steel or other reinforcing plate having substantially the same shape as the piezoelectric elements and a thickness that is less than that of the piezoelectric elements is sandwiched between two rectangular plate-shaped piezoelectric elements. Lead zirconate titanate (PZT (registered trademark)), quartz, lithium niobate, barium titanate, lead titanate, lead metaniobate, polyvinylidene fluoride, lead zinc niobate, lead scandium niobate, and various other substances can be used as the piezoelectric element.

The vibrating body 12 has a contacting portion 13 in the substantial center in the width direction of the short side. This contacting portion 13 is obtained by cutting and molding the reinforcing plate, or by another method, and the distal end portion thereof having a gently curved surface is caused to protrude from the piezoelectric element. The vibrating body 12 maintains a position wherein the distal end of the contacting portion 13 is brought into contact with the external peripheral surface of the rotor 20. A supporting member 14 and an urging member 15 are provided to the piezoelectric actuator A in order to keep the vibrating body 12 in this type of position.

The supporting member 14 of the piezoelectric actuator A is formed in integral fashion with the reinforcing plate by cutting and molding the reinforcing plate, or another method. This supporting member 14 is an L-shaped member composed of a perpendicular portion that protrudes perpendicularly from the substantial center of the long side of the vibrating body 12, and a horizontal portion that extends parallel towards the rotor 20 from the distal end of the perpendicular portion to the long side. A pin protruding from the bottom plate 11 is passed through the end of the horizontal portion on the other side from the perpendicular portion, and the supporting member 14 and the vibrating body 12 fixed thereto can rotate about the axis of this pin. One end of the urging member 15 is engaged in the substantial center of the horizontal portion of the supporting member 14. A pin protruding from the bottom plate 11 is passed through the substantial center portion of the urging member 15, and the urging member is able to rotate about the axis of the pin. The end of the urging member 15 on the opposite side from the supporting member 14 is engaged with the bottom plate 11, and the pressure with which the contacting portion 13 of the vibrating body 12 is pressed against the external peripheral surface of the rotor 20 can be adjusted by changing the position of the end of the urging member.

In the above configuration, the vibrating body 12 of the piezoelectric actuator A operates such that longitudinal vibration as a first vibration mode and flexural vibration as a second vibration mode induced by the longitudinal vibration are generated by a drive signal having a specific frequency being applied to the piezoelectric element from the drive control apparatus 100, and the contacting portion 13 traces an elliptical orbit in the plane that includes the plate surface. The external peripheral surface of the rotor 20 is struck by the contacting portion 13 of the vibrating body 12, and is driven around in the clockwise direction as indicated by the arrow in FIG. 2. The rotation of the rotor 20 is transmitted to the date indicator driving wheel 40 via the intermediate date wheel 30, and the date indicator driving wheel 40 rotates the date indicator 50 in the clockwise direction. These transfers of power from the vibrating body 12 to the rotor 20, from the rotor 20 to the reduction train wheel (intermediate date wheel 30 and date indicator driving wheel 40), and from the reduction train wheel to the date indicator 50 are all transfers of power in the direction parallel to the surface of the bottom plate 11 of the vibrating body 12. Therefore, rather than a coil or rotor being stacked in the thickness direction as in a stepping motor, the vibrating body 12 and the rotor 20 are disposed in the same plane, and the date display mechanism 10 can be made thinner. Since the date display mechanism 10 can be made thinner, the electronic clock 1 as a whole can be made thinner.

[1-2. Structure of the Drive Control Apparatus of the Piezoelectric Actuator A]

The relationship between the vibration state of the vibrating body 12 and the drive frequency of the applied drive signal will first be described based on FIG. 3 before description of the structure of the drive control apparatus 100.

Figure 3:
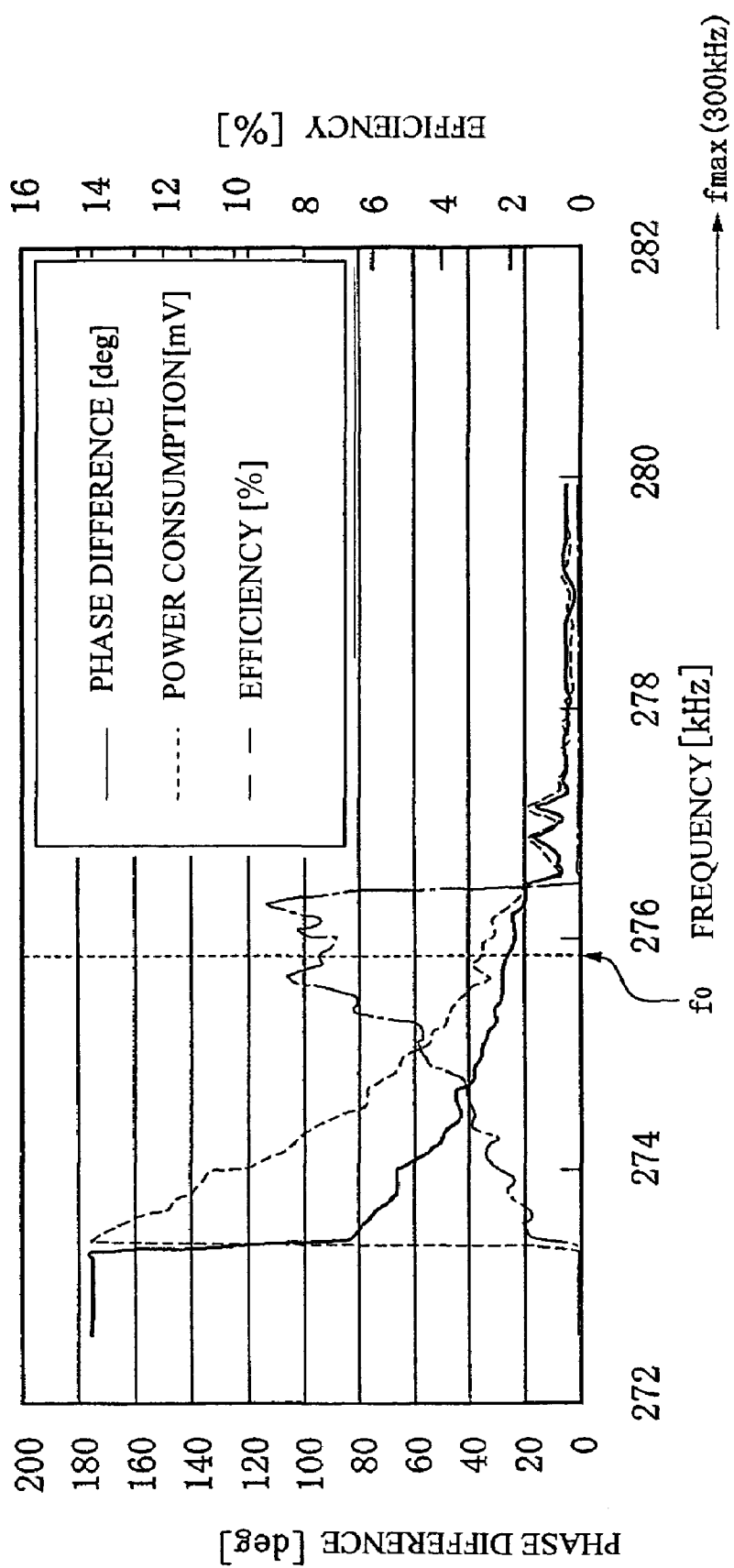
FIG. 3 is a diagram showing the vibration state in the piezoelectric actuator.

FIG. 3 is a diagram showing the relationship of the vibration state (phase difference between the detection signal and the drive voltage signal, the power consumption of the piezoelectric actuator A, and the drive efficiency) of the vibrating body 12 with respect to the drive frequency of the drive voltage signal. In this arrangement, the detection signal is the signal obtained from the vibration detection electrode (piezoelectric element) as the vibration detection means positioned at the piezoelectric element of the vibrating body 12, and this signal indicates the vibration of the vibrating body 12. In the same diagram, the phase difference indicated by the solid line and the power consumption indicated by the dashed line decrease as the drive frequency of the drive voltage increases, and the drive efficiency indicated by the dotted line peaks at a specific drive frequency (a frequency near 276 kHz in the present embodiment). Specifically, it is apparent that the drive efficiency of the piezoelectric actuator A is dependent on the drive frequency of the drive voltage, and that an optimum drive frequency (optimum drive frequency f0; frequency for obtaining the target vibration state) exists whereby excellent drive efficiency is obtained.

When the piezoelectric actuator A is driven at a drive frequency that is lower than the optimum drive frequency f0, the power consumption sharply increases and the drive efficiency is severely reduced, and at a frequency that deviates (in a range less than 274 kHz or more than 276.5 kHz in the diagram) from the optimum drive frequency f0, the drive efficiency reaches 0 (zero); specifically, the piezoelectric actuator A cannot be driven, or does not operate according to design even when it can be driven.

The numerical values in the graph of FIG. 3 are actual measured values relating to a specific piezoelectric actuator A, and do not limit the drive frequency of the drive voltage signal, the phase difference, the power consumption, the drive efficiency, or the like in the piezoelectric actuator A of the present invention.

The drive control apparatus of the present embodiment will next be described based on FIG. 4.

The drive control apparatus 100 of the present embodiment is mounted as a circuit on an IC chip, and performs feedback control of the piezoelectric actuator A whereby the phase difference to be the optimum drive frequency f0 is set as the target phase difference from the relationship between the vibration state of a vibrating body 12 such as the one described above and the drive frequency of the drive signal, and modifies the drive frequency of the drive voltage signal applied to the vibrating body 12 so that the phase difference detected during driving approaches the target phase difference. The drive control apparatus 100 is also configured so as to perform sweep control for gradually reducing the frequency from a frequency (initial frequency fmax) that is sufficiently higher than the optimum drive frequency f0 during startup of the piezoelectric actuator A and adjusting the drive frequency of the drive voltage signal to the optimum drive frequency f0.

Figure 4:
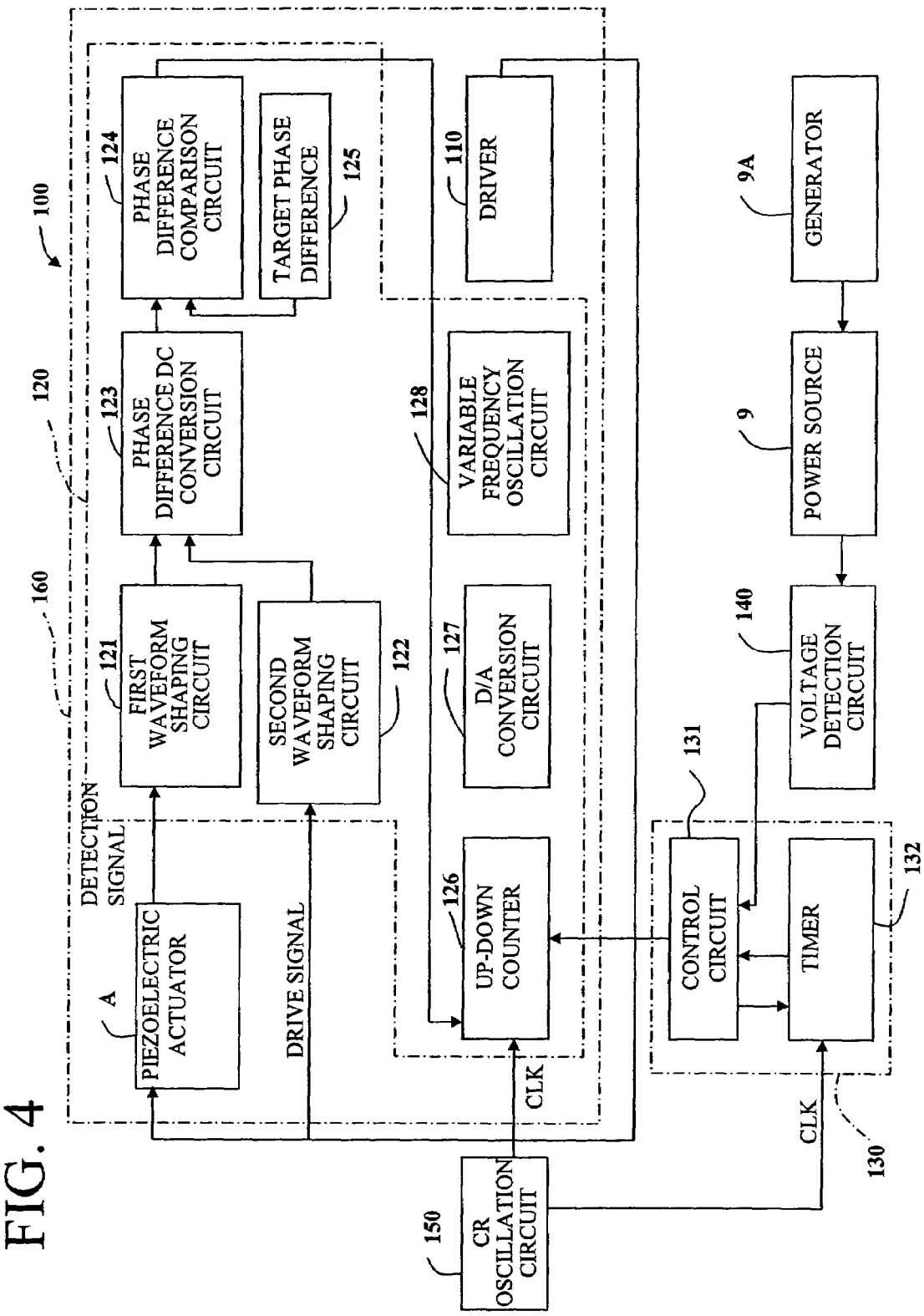
FIG. 4 is a block diagram showing the drive control apparatus for a piezoelectric actuator.

FIG. 4 is a block diagram showing the drive control apparatus 100 of the present embodiment.

As shown in FIG. 4, the drive control apparatus 100 for performing drive control of the piezoelectric actuator A is provided with a driving means 160 that contains a driver 110 as a driving means for sending a drive signal to the piezoelectric actuator A, and a drive frequency modifying means 120 for inputting the detection signal from the piezoelectric actuator A and the drive signal from the driver 110 and modifying the drive frequency of the drive signal from the prescribed drive frequency to a modified drive frequency; a control means 130 for controlling the operation of the drive frequency modifying means 120; and a voltage detection circuit 140 as a voltage detection means for detecting the power source voltage supplied from the secondary battery 9. In FIG. 4, the CR oscillation circuit 150 outputs the basic clock drive signal (CLK) of the electronic clock 1 to the drive frequency modifying means 120 and control means 130, and is the same as the oscillation circuit 4.

The drive frequency modifying means 120 is provided with first and second waveform shaping circuits 121 and 122, a phase difference DC conversion circuit 123 as a phase difference detection means, a phase difference comparison circuit 124 as a comparison means, an up-down counter 126, a D/A conversion circuit 127, and a variable frequency oscillation circuit 128. Specifically, the drive frequency modifying means 120 detects the drive signal outputted from the driver 110 to the vibrating body 12, and also detects the detection signal outputted from the vibration detection electrode according to the vibration of the vibrating body 12 as a result of applying the drive signal to the drive electrode of the vibrating body 12, and further detects the phase difference between the drive signal and the detection signal, compares the phase difference thus detected with the target phase difference that is set based on the optimum drive frequency f0, modifies the drive frequency of the drive signal to a modified drive frequency based on the results of this comparison, and outputs the drive frequency signal thus modified to the driver 110. The driver 110 is electrically connected to the drive electrode of the vibrating body 12, and is a circuit for amplifying the output signal from the variable frequency oscillation circuit 128 and applying the drive signal to the drive electrode of the vibrating body 12.

The first and second waveform shaping circuits 121 and 122 are electrically connected to the driver 110 and the vibration detection electrode of the vibrating body 12, respectively, and are circuits for inputting the drive signal outputted from the driver 110 and the detection signal outputted from the vibration detection electrode, shaping the waveforms of the drive signal and detection signal, and outputting the drive signal and detection signal thus shaped to the phase difference DC conversion circuit 123.

The phase difference DC conversion circuit 123 is a circuit for outputting a signal in accordance with the phase difference of the drive signal and the detection signal shaped by the waveform shaping circuits 121 and 122. This phase difference DC conversion circuit 123 is provided with a phase difference detecting unit not shown in the diagram, and an average voltage conversion unit. The phase difference detecting unit generates a phase difference signal having a pulse width that corresponds to the phase difference between the drive signal and the detection signal, and outputs this phase difference signal to the average voltage conversion unit. The average voltage conversion unit averages the phase difference signal outputted from the phase difference detection unit and outputs a phase difference signal at a level proportional to the phase difference between the drive signal and the detection signal to the phase difference comparison circuit 124.

The phase difference comparison circuit 124 compares the voltage value of the phase difference signal outputted from the phase difference DC conversion circuit 123 with a reference voltage value that corresponds to the target phase difference 125 set based on the optimum drive frequency f0, and outputs the comparison information that is the result of this comparison to the up-down counter 126. This phase difference comparison circuit 124 is composed of a comparator, for example, and outputs a high-level signal (H) as comparison information to the up-down counter 126 when the voltage value of the phase difference signal is at or below the reference voltage value. A low-level signal (L) is also outputted as the comparison information to the up-down counter 126 when the voltage value of the phase difference signal is equal to or greater than the reference voltage value. By this configuration, drive control is performed whereby the drive frequency of the drive signal outputted from the driver 110 is locked near the optimum drive frequency f0 according to design.

The up-down counter 126 is a circuit for modifying the drive frequency of the drive signal to the variable frequency oscillation circuit 128 based on the comparison information (H or L signals) outputted from the phase difference comparison circuit 124, and is provided with two AND gates not shown in the diagram. These AND gates input the signal (H or L) of the comparison information outputted from the phase difference comparison circuit 124 and a CLK signal transmitted from the CR oscillation circuit 150, perform up-count input according to the input timing of the CLK signal when the comparison information is a high-level signal (H), and perform down-count input when the comparison information is a low-level signal (L). The up-down counter 126 is composed of a 12-bit counter or the like, for example, and the counter raises or lowers the counter value according to the up-count input or down-count input from the AND gates, and outputs a 12-bit counter value to the D/A conversion circuit 127.

A frequency control voltage value corresponding to the counter value of the up-down counter 126 is set in the D/A conversion circuit 127. When the counter value outputted from the up-down counter 126 is inputted to the D/A conversion circuit 127, the D/A conversion circuit outputs a frequency control voltage signal to the variable frequency oscillation circuit 128 that corresponds to the frequency control voltage value according to the counter value.

The variable frequency oscillation circuit 128 oscillates at a frequency according to the frequency control voltage signal outputted from the D/A conversion circuit 127 and outputs that signal to the driver 110. The driver 110 applies a drive signal having the drive frequency according to the output signal from the variable frequency oscillation circuit 128 to the drive electrode of the vibrating body 12.

The control means 130 controls the drive frequency modification processing of the drive signal by the drive frequency modifying means 120 based on the power source voltage detected by the voltage detection circuit 140. Specifically, the control means 130 performs two types of control that include the sweep control in the startup process of the piezoelectric actuator A described hereinafter, and the intermittent drive control of the piezoelectric actuator A.

The control means 130 is provided with a control circuit 131 and a timer 132. The timer 132 inputs the CLK signal transmitted from the CR oscillation circuit 150 and outputs time information to the control circuit 131 according to the CLK signal. The control circuit 131 outputs a command for resetting the time information to the timer 132 during sweep control or intermittent drive control. The power source voltage signal from the voltage detection circuit 140 is also inputted to the control circuit 131, and the control circuit 131 detects the power source voltage value of the secondary battery 9 using this power source voltage signal.

The control circuit 131 outputs a control signal to the up-down counter 126 or driver 110 based on the power source voltage signal from the voltage detection circuit 140 and the time information from the timer 132. Specifically, during sweep control of the piezoelectric actuator A, the control circuit 131 outputs a reset signal to the up-down counter 126, the counter value is set to 0, and the drive frequency of the drive signal is reset to the initial frequency (prescribed drive frequency) fmax. In intermittent drive control of the piezoelectric actuator A, the control circuit 131 outputs a stop signal or a restart signal to the driver 110, and causes outputting of the drive signal from the driver 110 to the piezoelectric actuator A to be stopped or restarted.

This type of control by the control circuit 131 is performed based on the power source voltage. Specifically, sweep control is performed at the startup time of the piezoelectric actuator A or when the reduction rate of the power source voltage is higher than the standard reduction rate. Intermittent drive control is performed after startup of the piezoelectric actuator A when the reduction rate of the power source voltage is lower than the standard reduction rate.

The control circuit 131 operates with the drive initiation signal from the switch 8 as a trigger, and starts up the piezoelectric actuator A based on the CLK signal transmitted from the CR oscillation circuit 150. The rotation detection signals from the leaf spring 34 and terminal 35 that constitute the rotation detection means of the date display mechanism 10 are inputted to the control circuit 131, and the control circuit 131 is adapted to send a stop signal to the driver 110 and to stop driving of the piezoelectric actuator A based on this signal.

Specifically, the number of rotations of the intermediate date wheel 30 is detected from the number of instances of contact between the leaf spring 34 and terminal 35 of the date display mechanism 10, and the number of rotations thus detected is inputted to the control circuit 131 as a rotation detection signal. By this configuration, a prescribed amount of driving of the piezoelectric actuator A, specifically, one day's worth of rotation of the date indicator 50 can be detected. The configuration in which a leaf spring 34 or terminal 35 is used to detect the amount of rotation of the date indicator 50 is not limiting, and a configuration may also be adopted whereby the state of rotation of the rotor 20 or intermediate date wheel 30 is detected and a prescribed pulse signal is outputted, or another configuration. Specifically, publicly known photoreflectors, photointerrupters, MR sensors, and various other types of rotation encoders and the like may be used.

The drive frequency modifying means 120 may be provided with an integration circuit not shown in the diagram instead of the up-down counter 126, and may be configured so as to modify the drive frequency of the drive signal to a modified drive frequency based on the output value of the integration circuit. The integration circuit is composed of a capacitor, and the drive frequency of the drive signal is modified by outputting the amount of charge stored in the capacitor as an output value to the D/A conversion circuit 127. A configuration may be adopted whereby when the drive frequency of the drive signal is reset, the charge of the capacitor is released according to a command from the control circuit 131, and the drive frequency is reset to the initial frequency fmax that is set according to a state in which the charge is zero.

[1-3. Drive Control Method of Piezoelectric Actuator A]

Figure 5:
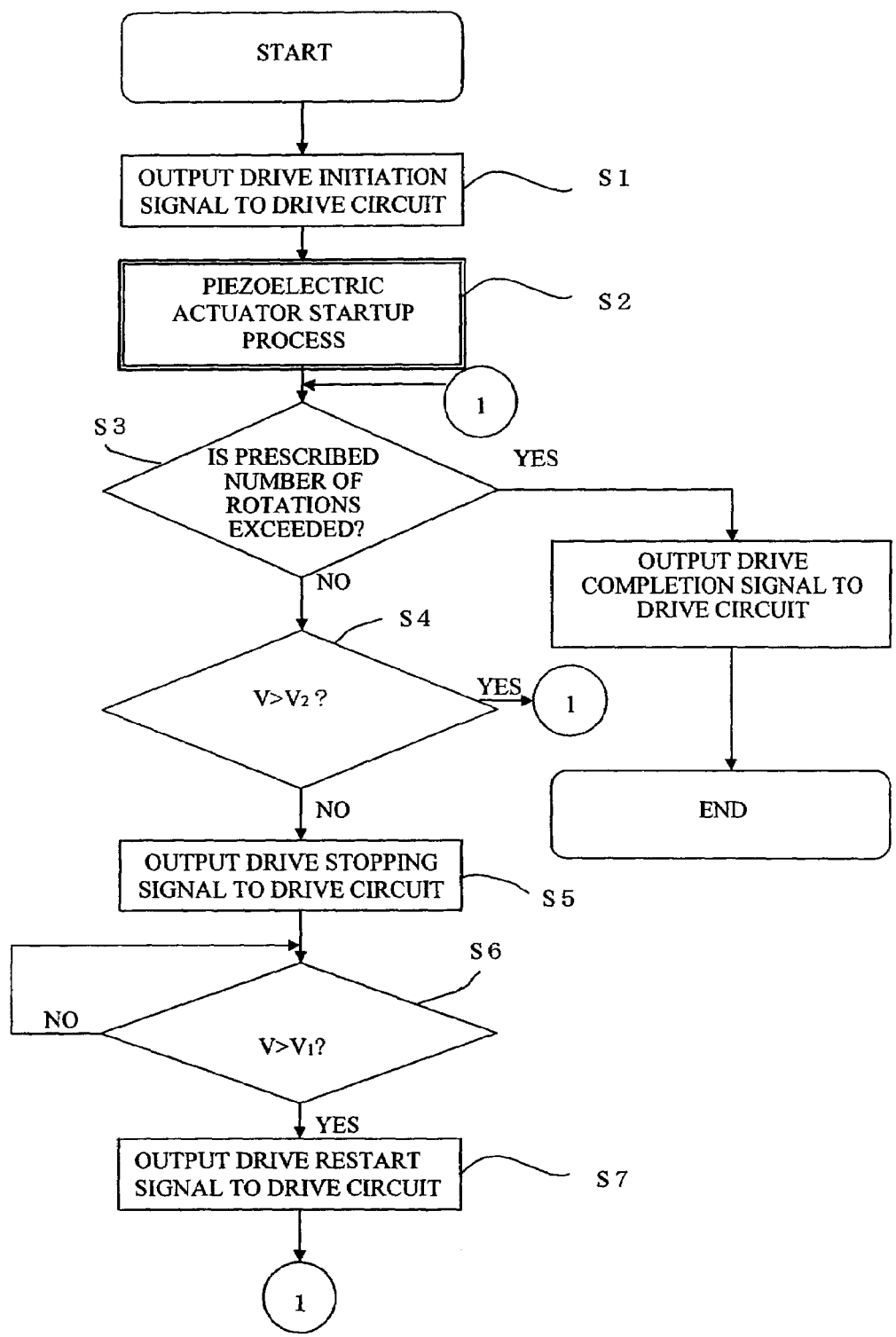
FIG. 5 is a flowchart describing the drive control method of the piezoelectric actuator.
Figure 6:
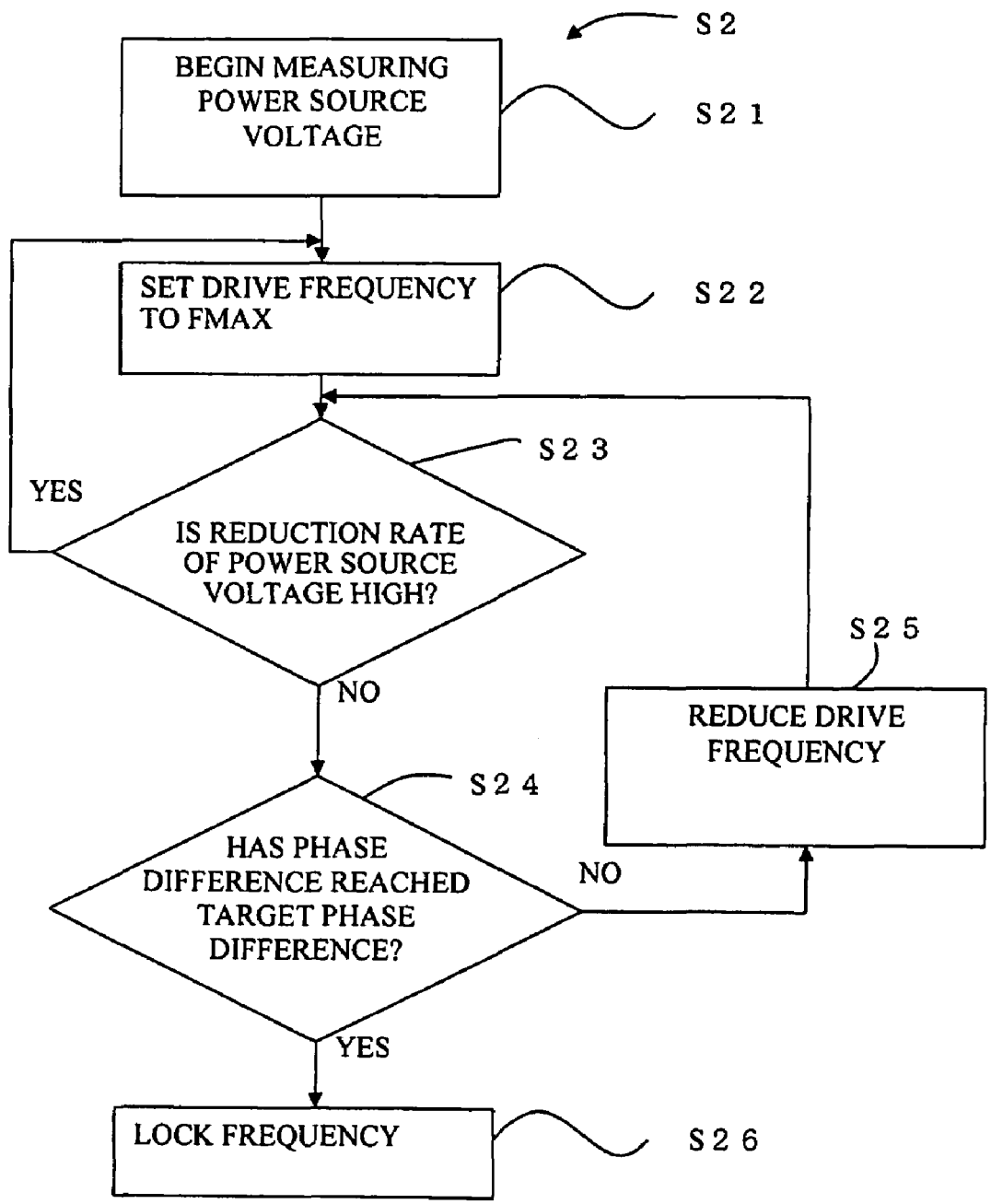
FIG. 6 is a flowchart describing a portion of the drive control method.
Figure 7:
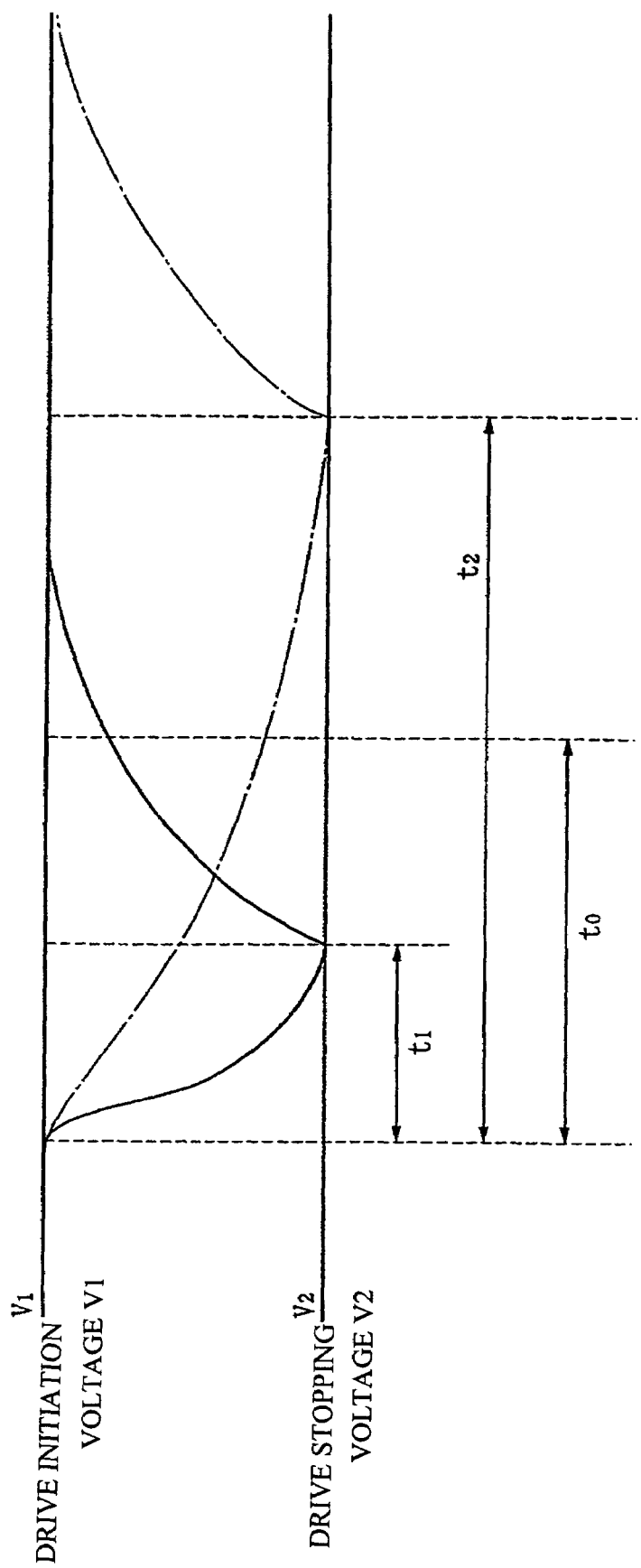
FIG. 7 is a timing chart showing the operation of the drive control apparatus.

FIG. 5 is a flowchart describing the drive control method of the piezoelectric actuator A. FIG. 6 is a flowchart describing a portion of the drive control method. FIG. 7 is a timing chart showing the operation of the drive control apparatus 100.

The method whereby the piezoelectric actuator A is driven by the drive control apparatus 100 described above will be described hereinafter with reference to FIGS. 5 through 7.

The control circuit 131 having received the drive initiation signal from the switch 8 outputs the drive initiation signal to the driver 110, and initiates driving of the piezoelectric actuator A (step S1).

Next, in the startup process of step S2 shown in FIG. 6, the control circuit 131 issues a command to the voltage detection circuit 140 and initiates measurement of the power source voltage (step S21; voltage detection step).

The control circuit 131 outputs the reset signal to the up-down counter 126, the counter value is set to 0, and the drive frequency of the drive signal is set to the initial frequency (prescribed drive frequency) fmax (step S22).

In the following step S23, the control circuit 131 determines whether the reduction rate of the power source voltage is higher than the standard reduction rate based on the time signal from the timer 132 and the power source voltage signal from the voltage detection circuit 140. As shown in FIG. 7, the standard reduction rate is the reduction rate when the time required for the power source voltage to decrease from the drive initiation voltage V1 to the drive stop voltage V2 is the standard time t0. The standard time t0 herein is set based on the startup time of the piezoelectric actuator A. For example, the standard time t0 is set to about 2 msec in the case of a piezoelectric actuator A for which the startup time is about 1 msec. Specifically, it is determined that the reduction rate of the power source voltage is higher than the standard reduction rate when the time t required for the power source voltage to decrease to the drive stop voltage V2 is shorter than the standard time t0, and it is determined that the reduction rate of the power source voltage is lower than the standard reduction rate when the required time is longer than the standard time t0.

In step S23 (control step), when the reduction rate of the power source voltage is higher than the standard reduction rate ("Yes"), or when the voltage decreases early as indicated by the solid line in FIG. 7, and has decreased to the drive stop voltage V2 in a time t1 shorter than the standard time t0, the process returns again to step S22, and re-sweeping of the drive frequency from the initial frequency fmax is performed. Specifically, it is determined that since the power source voltage decreases abruptly (the drive efficiency is poor), the piezoelectric actuator A has failed to start up, and it is restarted. In the case of restarting, the piezoelectric actuator A is stopped for a prescribed period of time and is caused to wait until the power source voltage is restored to the drive initiation voltage V1. A case in which it would be determined that the piezoelectric actuator A has failed to start up may include a case in which drive initiation of the piezoelectric actuator A cannot be performed regardless of the drive signal applied from the driver 110; a case in which the drive frequency jumps over the optimum drive frequency f0 due to a fluctuating detection signal during the sweep, producing a drive signal whose frequency is lower than the optimum drive frequency f0; and the like. Since the drive efficiency becomes poor in such cases, the power source voltage sharply decreases. The fact that the drive of the piezoelectric actuator A cannot be started, or that the detection signal becomes nonuniform may be caused, for example, by temporary changes in the vibration state of the piezoelectric actuator A due to electrostatic noise, impact, vibration, and the like.

In step S23, when the reduction rate of the power source voltage is lower than the standard reduction rate ("No"), or when the voltage as indicated by the dotted line in FIG. 7 decreases to the drive stop voltage V2 in a time t2 longer than the standard time t0, it is determined that the piezoelectric actuator A has started up successfully, and the process proceeds to the next step S24.

In step S24, the target phase difference is compared with the phase difference between the drive signal in which the drive frequency gradually decreases and the detection signal, and in the time until the phase difference reaches the target phase difference, specifically, when the determination in step S24 is "No," the counter value of the up-down counter 126 is increased in the drive frequency modifying means 120 of step S25, the frequency for gradually reducing the drive frequency according to the counter value is swept (drive frequency modifying step), the process returns to step S23, and the reduction rate of the power source voltage is again determined.

In step S24, when the phase difference has reached the target phase difference ("Yes"), or when it is determined that the phase difference has exceeded the target phase difference in the phase difference comparison circuit 124, the process proceeds to the next step S26.

In step S26, the drive frequency of the drive signal is locked at the frequency (optimum drive frequency f0) of the time at which the target phase difference was reached, the process proceeds to step S3 in FIG. 5, and driving of the piezoelectric actuator A is continued.

Sweep control of the piezoelectric actuator A is performed by steps S21 through S26 described above.

The operation in which the piezoelectric actuator A that has successfully started up as described above and that is driven near the optimum drive frequency f0 is completed when the number of rotations of the intermediate date wheel 30 exceeds the prescribed number of rotations in step S3 described below.

During the time until the prescribed number of rotations is reached, or when the determination in step S3 is "No," the power source voltage V is compared with the minimum operating voltage V2 in step S4, and driving of the piezoelectric actuator A is continued during the time in which the power source voltage V is over the minimum operating voltage V2. In other words, in step S4, when the determination is "Yes," the driver 110 continues to apply the drive signal, and the piezoelectric actuator A continues to operate until the number of rotations of the intermediate date wheel 30 exceeds the prescribed number of rotations. Since the piezoelectric actuator A continues to operate, the battery voltage V gradually decreases as shown in FIG. 7.

When the determination is "No" in step S4, specifically, when the power source voltage V has decreased below the minimum operating voltage V2, the control circuit 131 outputs a drive stopping signal for issuing a command to stop driving to the driver 110, and driving of the piezoelectric actuator A is stopped (step S5). Since driving of the piezoelectric actuator A is stopped, the battery voltage V gradually recovers as shown in FIG. 7.

In the following step S6, during the time in which the power source voltage V is below the drive initiation voltage V1, or when the determination in step S6 is "No," the control circuit 131 maintains the state in which driving of the piezoelectric actuator A is stopped, and waits until the power source voltage V is restored to the drive initiation voltage V1.

When the power source voltage V is greater than the drive initiation voltage V1, or when the determination in step S6 is "Yes," the control circuit 131 outputs a drive restart signal for ordering driving to be restarted to the driver 110, and driving of the piezoelectric actuator A is restarted (step S7). The process returns to step S3 after driving of the piezoelectric actuator A is restarted, and the piezoelectric actuator A is intermittently driven during the time until the number of rotations of the intermediate date wheel 30 exceeds the prescribed number of rotations.

As described above, intermittent drive control is performed by repeatedly stopping and restarting the driving of the piezoelectric actuator A in steps S4 through S7. During intermittent driving, feedback control is performed whereby the phase difference between the detection signal and the drive signal is compared by the phase difference comparison circuit 124 of the drive frequency modifying means 120, the counter value of the up-down counter 126 is modified, and the drive frequency of the drive signal is adjusted based on this modification so as not to deviate from the optimum drive frequency f0.

In step S3, the control circuit 131 determines whether the number of rotations of the intermediate date wheel 30 has exceeded the prescribed number of rotations, or whether the date indicator 50 has completed one day's worth of rotation, based on the rotation detection signal inputted from the rotation detection means. When the date indicator 50 has not rotated enough times, or when the determination in step S10 is "No," driving of the piezoelectric actuator A is continued. When the date indicator 50 has rotated by the prescribed amount and the determination in step S3 is "Yes," the drive stopping signal is outputted to the driver 110, driving of the piezoelectric actuator A is stopped, and drive control is completed.

In the above drive control, if the battery voltage V does not fall below the minimum operating voltage V2 before the date indicator 50 has rotated by the prescribed amount, the piezoelectric actuator A is then driven without being stopped from drive initiation to drive completion.

The sweep control in the previously described steps S21 through S26 is not limited to being performed only during the startup of the piezoelectric actuator A, and may also be performed during intermittent driving.

Specifically, even if the drive frequency of the drive signal is adjusted to the optimum drive frequency f0 by sweep control during startup, the drive frequency can deviate from the optimum drive frequency f0 for whatever reason during driving. Causes for the drive frequency of the piezoelectric actuator A deviating from the optimum drive frequency f0 herein include, among other things, temporary changes in the vibration state of the piezoelectric actuator A due to electrostatic noise, impact, vibration, or the like. There are also cases in which the frequency of the optimum drive frequency f0 itself varies according to variations in temperature or drive torque, rather than the drive frequency deviating from the optimum drive frequency f0. In such cases, even if the drive frequency of the drive signal is regulated by feedback control, the drive efficiency is adversely affected, causing the power consumption to increase and the power source voltage to be more likely to decrease. Therefore, the control circuit 131 monitors the reduction rate of the power source voltage based on the time signal from the timer 132 and on the power source voltage signal from the voltage detection circuit 140 during intermittent driving as well, and executes the sweep control of steps S21 through S26 again when the reduction rate is higher than the standard reduction rate. By this configuration, the drive efficiency of the piezoelectric actuator A can be stabilized at all times.

[1-4. Effect of First Embodiment]

Such effects as the following are obtained by the first embodiment described above.

(1) Specifically, when startup of the piezoelectric actuator A has failed, and in other cases wherein drive efficiency is adversely affected, restarting (re-sweep) can be immediately performed since the reduced drive efficiency is immediately determined based on the reduction rate of the power source voltage, and the processing from detection of the abnormality until optimization of the drive signal can be quickly executed, power consumption can be reduced, and low-power operation can be obtained since the time required for this determination is shortened with respect to the conventional configuration.

(2) Even when the drive frequency of the drive signal deviates from the optimum drive frequency f0 for whatever reason during driving of the piezoelectric actuator A, the drive signal of the piezoelectric actuator A can be adjusted to the optimum drive frequency by re-sweeping based on the reduction rate of the power source voltage since the reduction rate increases if there is a significant decrease in drive efficiency due to deviation from the optimum drive frequency f0.

(3) Furthermore, since the standard reduction rate (standard time t0) is set based on the startup time of the piezoelectric actuator A, the success or failure of startup of the piezoelectric actuator can be determined with higher precision, and the time required until re-sweeping when startup fails can be further shortened.

(4) Since a configuration is adopted whereby feedback control is performed based on comparison of a phase difference, whether to increase or decrease the drive frequency can be immediately determined in the phase difference comparison circuit 124 from the size difference between the target phase difference and the phase difference of the detection signal and drive voltage signal detected by the phase difference DC conversion circuit 123, and drive control can be performed more rapidly.

(5) Since the resonance frequency is not passed through in reduction from the initial frequency fmax towards a low frequency, specifically, in sweeping from a high frequency at which the power consumption is low in sweep control, the drive frequency can be adjusted to the optimum drive frequency f0 while power consumption is minimized.

(6) The reduction rate of the power source voltage can be immediately computed from the relationship between the power source voltage detected by the voltage detection circuit 140 and the time required until the voltage falls below the drive stop voltage V2 measured by the timer 132, and whether to restart the piezoelectric actuator A can be quickly determined.

(7) By sweeping the drive frequency of the drive signal based on the counter value (or the output value of the integration circuit) of the up-down counter 126 and initializing (resetting) the counter value, the drive frequency can be returned to the initial frequency fmax, the piezoelectric actuator A can be restarted, sweep control can be easily performed, and the structure of the circuits of the drive control apparatus 100 can be simplified.

(8) Since the date display mechanism 10 is driven by the piezoelectric actuator A, high-efficiency driving can be performed in a narrow-profile structure, and the electronic clock 1 can be reduced in size. Furthermore, since the date display mechanism 10 driven by the piezoelectric actuator A is driven for a limited time within one day, rather than being continuously driven all the time, and may be driven a prescribed amount (amount of rotation), sweep control that is capable of appropriately driving the piezoelectric actuator A during driving initiation is well-suited in this configuration.

(9) Furthermore, since the secondary battery 9 that is the power source is limited in size (capacity) in the electronic clock 1 of a wristwatch, the ability to minimize power consumption represents a significant advantage. Particularly, since the power source voltage is prone to decrease at the end of discharge by the secondary battery 9 or the like, driving of the piezoelectric actuator A can be reliably performed by performing restarting based on the reduction rate of the voltage.

2. Second Embodiment

A second embodiment of the present invention will next be described based on FIGS. 8 and 9.

The structure of the electronic clock 1 as the electronic device in the present embodiment is substantially the same as in the first embodiment, and detailed description thereof is omitted. Distinguishing features of the electronic clock 1 of the present embodiment are the relationship between the power source 9 and the time display unit and date display mechanism 10, and the relationship between the drive timing of the time display unit (pointer 2) and the drive timing of the date display mechanism 10. These distinguishing components will be described in detail hereinafter.

[2-1. Structure of Power Source and Drive Control Apparatus of Piezoelectric Actuator A]

Figure 8:
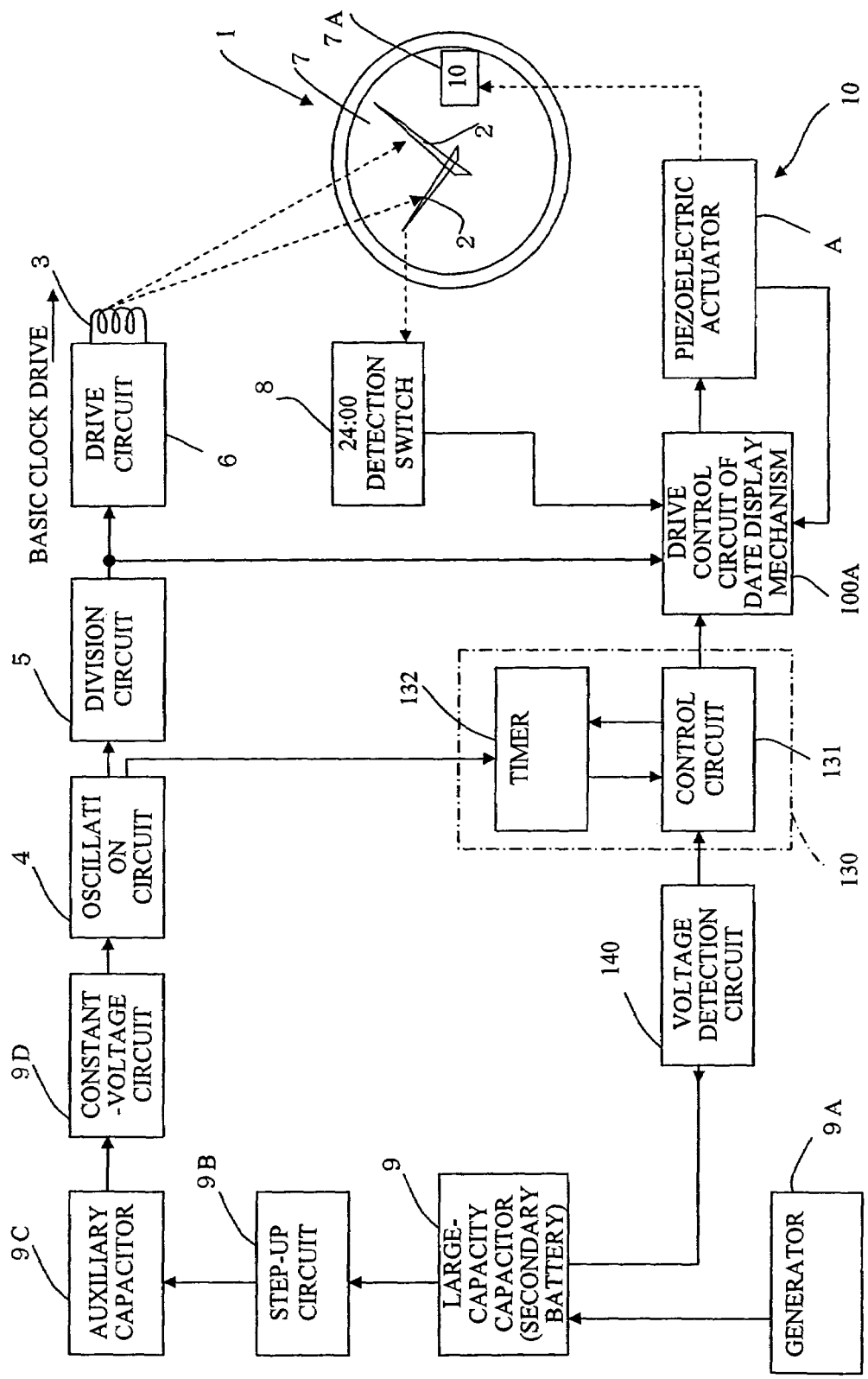
FIG. 8 is a diagram showing a schematic structure of the electronic device according to a second embodiment of the present invention.

FIG. 8 is a diagram showing the schematic structure of the electronic clock 1 as the electronic device in the present embodiment.

In FIG. 8, a large-capacity capacitor (secondary battery) 9 as the power source of the electronic clock 1 is connected to the oscillation circuit 4, division circuit 5, drive circuit 6, and stepping motor 3 as the drive unit of the time display unit via a step-up circuit 9B, an auxiliary capacitor 9C, and a constant-voltage circuit 9D. The large-capacity capacitor 9 is connected to the drive control circuit 100A of the date display mechanism 10 via a control means 130 and voltage detection circuit (voltage detection means) 140 that are the same as those shown in FIG. 4 in the first embodiment. The basic clock drive signal from the oscillation circuit 4 is inputted to the timer 132 of the control means 130 in this configuration. As described above, the power source voltage fed into the large-capacity capacitor 9 is stepped up by the step-up circuit 9B and temporarily fed into the auxiliary capacitor 9C, after which the power source voltage thus charged is applied to the drive unit of the time display unit, whereby a stable drive voltage can be supplied to the stepping motor 3, and the movement of the pointer 2 can be stabilized.

[2-2. Drive Control Method of Piezoelectric Actuator A]

The drive control method of the piezoelectric actuator A in the present embodiment controls the driving of the piezoelectric actuator A according to a load other than the piezoelectric actuator A in the electronic clock 1 at an operational timing such that loads do not overlap.

Examples of loads other than the piezoelectric actuator A in the electronic clock 1 herein include the drive pulse of the stepping motor 3 of the time display unit; drive pulses of an alarm, a server, or the like; the drive pulse of an oscillation motor; the drive pulse of a light-emitting diode in an optical position detection apparatus used for detecting the position of the pointer 2 and other moving members; and other large loads (heavy loading) on the power source voltage. The control method for controlling driving of the piezoelectric actuator A and the timing of voltage detection in the drive control of the piezoelectric actuator A will be described hereinafter based on the timing of the drive pulse for driving the stepping motor 3 (seconds motor) as a typical heavy-loading component.

Figure 9:
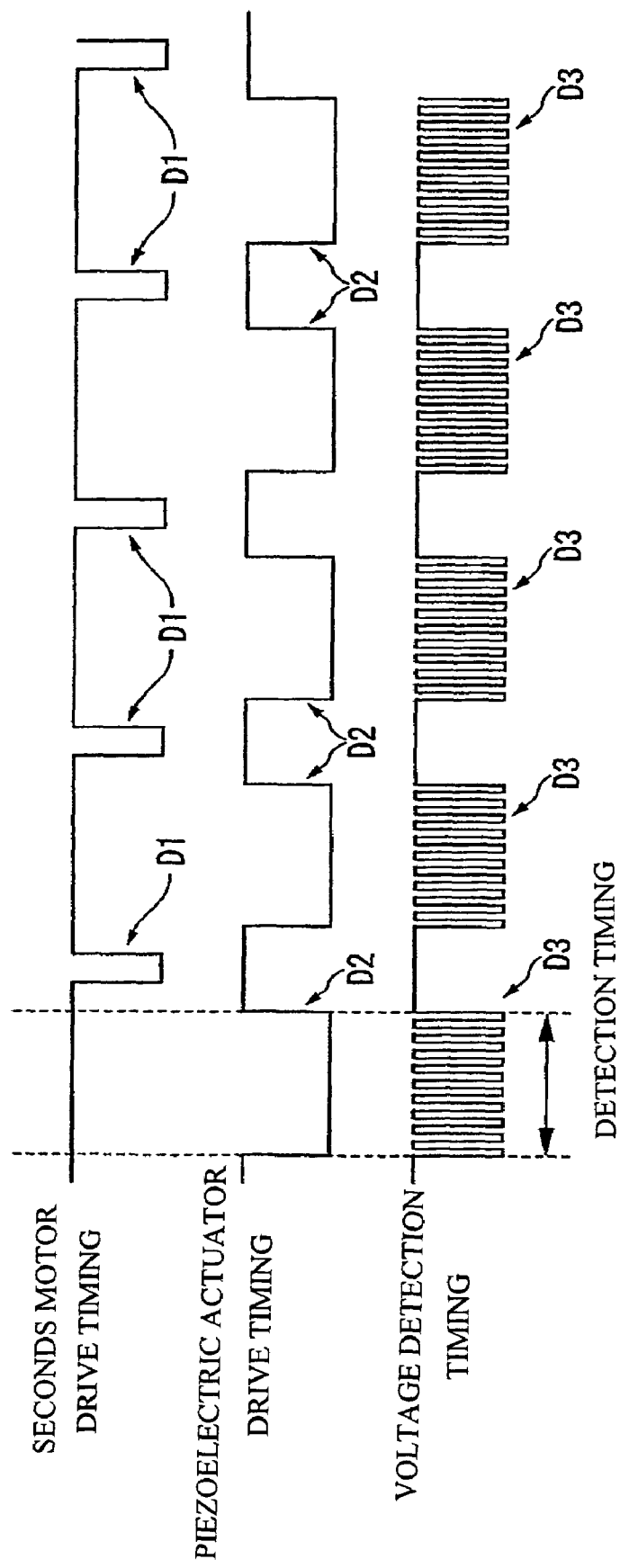
FIG. 9 is a timing chart showing the operation of the electronic device.

FIG. 9 is a timing chart showing the operation of the electronic clock 1.

In FIG. 9, the stepping motor 3 (seconds motor) is driven by a drive pulse D1 based on a reference signal of 1 Hz from the division circuit 5, and a voltage decrease therefore occurs at a timing of 1-second intervals. When startup of the piezoelectric actuator A is attempted at the timing at which this type of voltage decrease occurs, even though the actual power source voltage is not decreasing, the power source voltage is assumed to be decreasing, and the drive frequency is modified by the drive frequency modifying means 120 at frequent intervals. The detection timing D3 of the voltage decrease by the voltage detection circuit 140 in the drive control method of the present embodiment is therefore set based on the basic clock drive signal from the oscillation circuit 4 so as to deviate from the timing of the drive pulse D1 of the stepping motor 3 (seconds motor). In short, a configuration is adopted whereby detection of the voltage by the voltage detection circuit 140 is executed during the intervals (approximately 1-second intervals) of the 1 Hz reference signal, and voltage detection is not executed during the time from immediately before the drive pulse of the stepping motor 3 is outputted until immediately after the drive pulse is outputted. The drive timing D2 of the piezoelectric actuator A is also set so as to deviate from the timing of the drive pulse D1 of the stepping motor 3, the same as the detection timing D3.

According to this embodiment, the detection timing D3 of the voltage decrease is caused to deviate from the timing (timing of the drive pulse D1) at which components that have a heavy load on the power source voltage are driven, allowing the effects of such heavy loads to be circumvented and unnecessary modification of the drive frequency of the piezoelectric actuator A to be prevented regardless of whether the power source voltage is decreasing or the apparatus is operating normally. Therefore, the movement of the pointer 2 can be stabilized in the electronic clock 1, needless power consumption can be prevented, and an even lower-power operation can be obtained.

3. Third Embodiment

A third embodiment of the present invention will next be described based on FIGS. 10 and 11.

The present embodiment differs from the first and second embodiments in that the drive control apparatus 100 (drive control circuit 100A) is applied to a portable electronic device, but the structure of the drive apparatus of the piezoelectric actuator is the same as in each of the aforementioned embodiments. In the description of the third embodiment, constituent elements that are the same as in the aforementioned embodiments are assigned the same symbols, and description thereof is shortened or omitted.

[3-1. Structure of Electronic Device]

In the present embodiment, the electronic device (portable device) is a non-contact IC card 200, and this IC card 200 is provided with a piezoelectric actuator A and a drive apparatus 210.

Figure 10:
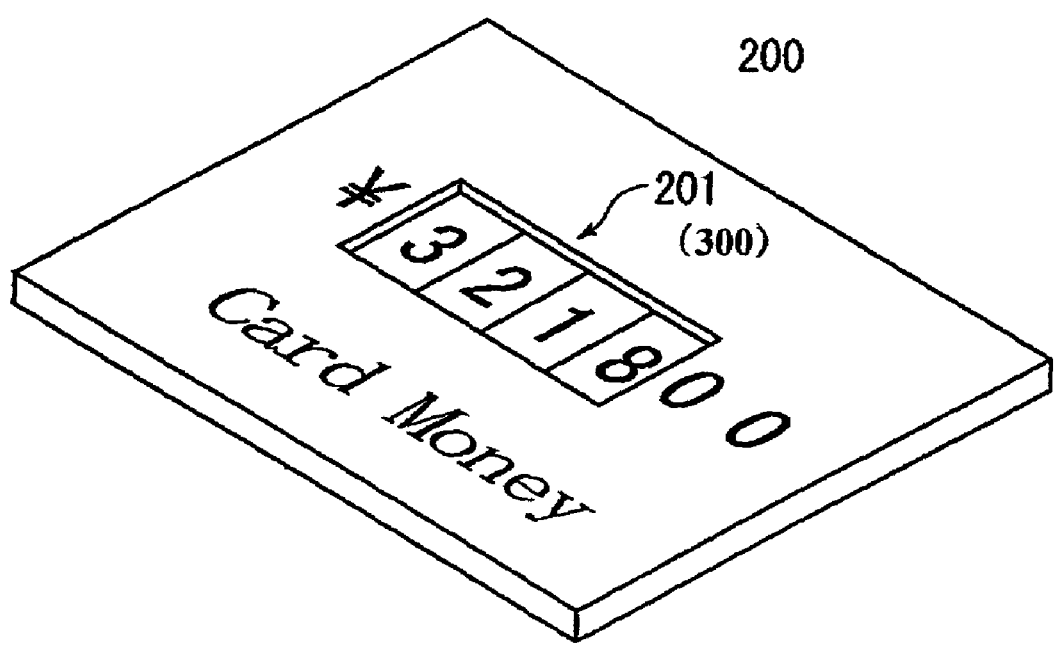
FIG. 10 is a perspective view showing the electronic device according to a third embodiment of the present invention.

FIG. 10 is a perspective view of the outside of the non-contact IC card 200.

In FIG. 18, a balance display counter 201 for displaying a balance is provided to the surface of the non-contact IC card 200.

Figure 11:
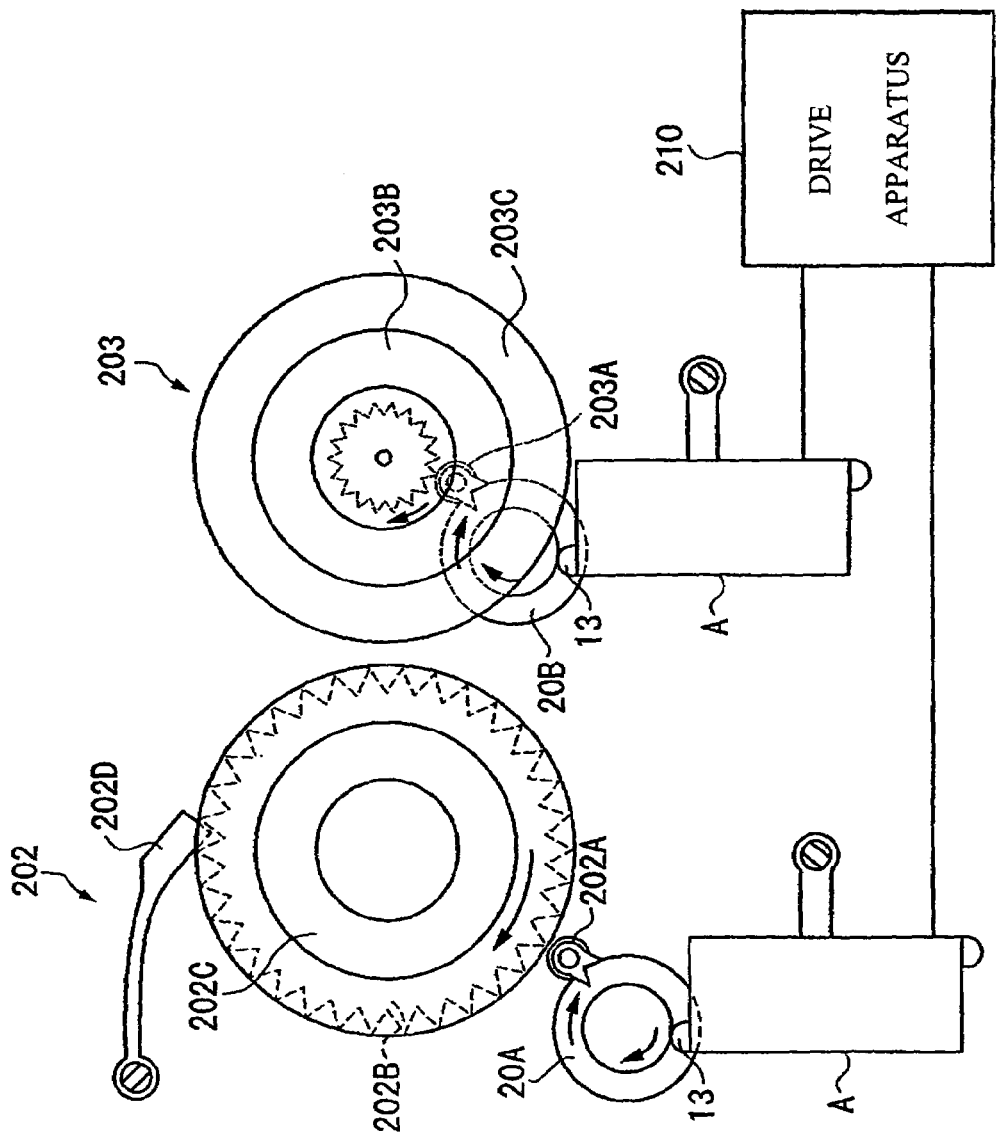
FIG. 11 is a front view of the detailed structure of the electronic device, showing the column display unit therein.

The balance display counter 201 displays a four-figure balance, and is provided with a high-order display unit 202 for displaying the upper two decimal places, and a low-order display unit 203 for displaying the lower two decimal places, as shown in FIG. 11.

The high-order display unit 202 (driven body 300) is connected to the piezoelectric actuator A via a rotor 20A, and is driven by the driving force of the rotor 20A. The high-order display unit 202 is provided with principal components that include a drive gear 202A that has an advancing tooth and that rotates once when the rotor 20A completes 1/n rotations, a first high-order display wheel 202B that rotates by one graduation for each rotation of the drive gear 202A, a second high-order display wheel 202C that rotates by one graduation for each rotation of the first high-order display wheel 202B, and a fixing member 202D for fixing the first high-order display wheel 202B when the first high-order display wheel 202B is not rotating. A fixing member not shown in the diagram is also provided for fixing the second high-order display wheel 202C, the same as for the first high-order display wheel 202B.

The drive gear 202A rotates once when the rotor 20A completes 1/n rotations. The advancing tooth of the drive gear 202A meshes with the advancing gear unit of the first high-order display wheel 202B, whereby the first high-order display wheel 202B rotates by one graduation. Furthermore, when the first high-order display wheel 202B rotates through one rotation, an advancing pin provided to the first high-order display wheel 202B rotates the advancing gear, the advancing gear of the second high-order display wheel 202C is caused to rotate, and the second high-order display wheel 202C is rotated by one graduation.

The low-order display unit 203 is connected to the piezoelectric actuator A via a rotor 20B, and is driven by the driving force of the rotor 20B. The low-order display unit 203 is provided with principal components that include a drive gear 203A that has an advancing tooth and that rotates once when the rotor 20B completes 1/n rotations, a first low-order display wheel 203B that rotates by one graduation for each rotation of the drive gear 203A, and a second low-order display wheel 203C that rotates by one graduation for each rotation of the first low-order display wheel 203B.

The first low-order display wheel 203B has an advancing gear unit that meshes with the advancing tooth of the drive gear 203A, and rotates by one graduation for each rotation of the drive gear 203A. The first low-order display wheel 203B is provided with an advancing pin, and each time the first low-order display wheel 203B rotates, the advancing gear is rotated, and the second low-order display wheel 203C is rotated by one graduation. In this case, the fixing member (not shown in the diagram) of the first low-order display wheel 203B and the second low-order display wheel 203C meshes with the respective advancing gear units thereof when the wheels are not rotating, and immobilizes the first low-order display wheel 203B and the second low-order display wheel 203C.

In the non-contact IC card 200 described above, the piezoelectric actuator A is set so as to be driven in synchrony by the drive apparatus 210, and the drive apparatus 210 is driven by the input of a drive control signal that corresponds to a settlement amount by an IC card chip not shown in the diagram. Since the specific structure of this drive apparatus 210 is the same as that of the drive control apparatus 100 in the previously described embodiments, description thereof is omitted.

By such a configuration as described above, the display of a monetary balance can be performed mechanically even in a narrow-profile portable device such as a non-contact IC card, and since displaying can be performed without the need for a power source at times other than when the device is driven, displaying can be performed by a product that uses little power, and even when the power source is no longer present, the display up to that point can be maintained.

[4. Modifications of Embodiments]

The present invention is not limited by the aforementioned embodiments, and such modifications as those described below are included therein.

For example, a wristwatch electronic clock 1 and a non-contact IC card 200 were described in the aforementioned embodiments, but the electronic clock is not limited to a wristwatch, and may also be a standing clock or a wall clock. The electronic device is also not limited to an electronic clock or an IC card, and it is possible to apply the present invention to various types of electronic devices. The present invention is particularly suitable for portable electronic devices in which small size is required. Examples of various types of electronic devices herein may include telephones provided with timekeeping ability, portable telephones, personal computers, portable information terminals (PDA), cameras, and the like. The present invention is also applicable to cameras, digital cameras, video cameras, camera-phones, and other electronic devices not provided with timekeeping ability. When the present invention is applied to these electronic devices provided with camera functionality, the piezoelectric actuator of the present invention can be used for driving a lens focusing mechanism, zoom mechanism, aperture adjustment mechanism, or the like. Furthermore, the piezoelectric actuator of the present invention may be used in the drive mechanism of a meter indicator for a measuring device, the drive mechanism of a movable toy, or the like.

A piezoelectric actuator A was used for driving the date display mechanism of an electronic clock 1 in the aforementioned embodiments, but this configuration is not limiting, and the hour display hand (pointer) of the electronic clock 1 may also be driven by the driving means of the present invention. By this type of configuration, since the stepping motor 3 for driving the pointer is replaced by the piezoelectric actuator A, the electronic clock can be made with an even narrower profile, and since the piezoelectric actuator A is less affected by magnetism than the stepping motor, high resistance to magnetism can be anticipated in the electronic clock.

Furthermore, the various means and the like in the drive control apparatus 100 were composed of various types of logic circuit elements and other hardware in the present invention, but this configuration is not limiting, and a configuration may be adopted whereby a computer provided with a CPU (central processing apparatus), memory (storage device), and the like is provided in the electronic device, a prescribed program or data (data stored in various storage units) is incorporated into the computer, and the functions of the various means are performed.

In this arrangement, the program or data may be stored in advance in RAM, ROM, or other memory built into the electronic device. The prescribed control program or data may also be installed in the memory of the electronic device via the Internet or another communication means, or a CD-ROM, memory card, or other storage medium. The CPU and the like may be operated by a program stored in the memory, and the functions of the various means performed. Installation of the prescribed program or the like into the clock or portable device may be performed by directly inserting a memory card, CD-ROM, or the like into the clock or portable device, or a device for reading these storage media may be connected to the clock or portable device from the outside. Furthermore, a LAN cable, telephone cable, or the like may be connected to the clock or portable device, and the program or the like fed to and installed therein by wired communication, or the program may be fed to and installed therein in wireless fashion.

In the aforementioned embodiments, a configuration was adopted whereby the phase difference between the drive voltage signal and the detection signal indicating the vibration state of the vibrating body 12 was detected, and the drive frequency of the drive signal was modified based on a comparison of the phase difference with the target phase difference, but this configuration is not limiting. Specifically, a configuration may be adopted whereby the voltage value or current value of the detection signal is used as an indicator of the vibration state of the vibrating body 12, and the voltage value or current value of the detection signal is compared with the voltage value or current value of the drive signal.

Furthermore, the target phase difference is not limited to a specific pre-set value, and may be configured so as to be modifiable as needed according to the vibration state of the vibrating body 12.

A configuration was also adopted in the aforementioned embodiments whereby the drive frequency was reduced from the high-frequency initial frequency fmax to obtain the modified drive frequency during sweep control, but this configuration is not limiting, and a low frequency may be set as the initial value, and the frequency may be increased from this initial value. Furthermore, the optimum drive frequency f0 of a prior driving time (of the previous day) may be stored in advance, and this prior day's value may be used as the initial value.

A configuration was also adopted in the aforementioned embodiments whereby the reduction rate of the power source voltage was computed using the timer 132, but this configuration is not limiting, and a configuration may be adopted whereby the number of instances of frequency modification processing during sweep control is counted using a counter or the like, and the reduction rate of the power source voltage is computed based on this count value.

The terms "in front of," "behind," "above," "below," "perpendicular," "horizontal," "slanted," and other terms used above for indicating directions refer to directions in the drawings used in the description. Therefore, these terms for indicating directions used for description of the present invention should be interpreted in corresponding fashion alongside the drawings used.

The terms "substantially," "approximately," "generally," and other terms for indicating extents in the above description indicate appropriate amounts of deviation that are of such magnitude as they do not ultimately bring about significant changes in the present invention. These terms for indicating extents should be interpreted as including at least about +5% error, insofar as no significant change is brought about by this deviation.

This specification claims priority of Japanese Patent Application No. 2004-076507. All disclosures of Japanese Patent Application No. 2004-076507 are incorporated herein by reference.

Only some working examples of the present invention are described above, but it is clear that one skilled in the art may add various modifications to the above working examples according to the above disclosure without exceeding the range of the present invention as defined in the claims. Furthermore, the examples described above are intended only to describe the present invention, and do not limit the range of the present invention as defined by the claims hereinafter or by equivalent claims.

What is claimed is:

1. A drive apparatus capable of being driven by electrical power from a power source and capable of driving a piezoelectric actuator provided with a vibrating body having a piezoelectric element that vibrates due to the application of a drive signal, said drive apparatus comprising:
   vibration detection means for detecting the vibration of the vibrating body and outputting a detection signal;
   driving means for receiving the electrical power in order to create a drive signal from the power source, creating the drive signal, supplying the drive signal to the piezoelectric element at a prescribed drive frequency, and supplying the drive signal to the piezoelectric element at a modified drive frequency set so that the vibration state of the vibrating body approaches the target vibration state when the vibration state detected from the detection signal differs from the target vibration state;
   voltage detection means for detecting at least one of the voltage of the power source and the voltage of the drive signal of the piezoelectric actuator; and
   control means for controlling the driving means so that the drive signal is set to a modified drive frequency after being temporarily set to the prescribed drive frequency when the reduction rate of at least one of the voltage of the power source detected by the voltage detection means and the voltage of the drive signal is higher than the pre-set standard reduction rate.

2. The drive apparatus according to claim 1, wherein:
   the standard reduction rate is set based on the required startup time of the piezoelectric actuator; and
   the control means controls the driving means at the time that driving of the piezoelectric actuator is initiated.

3. The drive apparatus according to claim 1, wherein the driving means comprises phase difference detection means for detecting the phase difference between the drive signal and the detection signal, and comparison means for comparing the phase difference with a pre-set target phase difference, and performs modification to the modified drive frequency so that the phase difference approaches the target phase difference based on the results of comparing the phase difference with the target phase difference.

4. The drive apparatus according to claim 1, wherein the prescribed drive frequency is a frequency higher than the frequency for obtaining the target vibration state.

5. The drive apparatus according to claim 1, wherein the control means has a timer for measuring the time until at least one of the voltage of the power source and the voltage of the drive signal is lower than a pre-set drive stop voltage; and the reduction rate is determined to be faster than the standard reduction rate when the time measured by the timer is shorter than a pre-set standard time.

6. The drive apparatus according to claim 1, wherein:
   the driving means has an up-down counter and modifies the drive frequency based on the counter value of the up-down counter; and
   the control means sets the drive signal to the prescribed drive frequency after resetting the counter value of the up-down counter when it is determined that the reduction rate of at least one of the voltage of the power source and the voltage of the drive signal is higher than the standard reduction rate.

7. The drive apparatus according to claim 1, wherein:
   the driving means has an integration circuit and modifies the drive frequency based on the output value of the integration circuit; and
   the control means sets the drive signal to the prescribed drive frequency after resetting the output value of the integration circuit when it is determined that the reduction rate of at least one of the voltage of the power source and the voltage of the drive signal is higher than the standard reduction rate.

8. An electronic device driven by electrical power from a power source, said electronic device comprising:
   a drive component comprising a piezoelectric actuator provided with a vibrating body having a piezoelectric element that vibrates due to the application of a drive signal; vibration detection means for detecting the vibration of the vibrating body and outputting a detection signal; driving means for receiving the electrical power in order to create a drive signal from the power source, creating the drive signal, supplying the drive signal to the piezoelectric element at a prescribed drive frequency, and supplying the drive signal to the piezoelectric element at a modified drive frequency set so that the vibration state of the vibrating body approaches the target vibration state when the vibration state detected from the detection signal differs from the target vibration state; voltage detection means for detecting at least one of the voltage of the power source and the voltage of the drive signal of the piezoelectric actuator; and control means for controlling the driving means so that the drive signal is set to a modified drive frequency after being temporarily set to the prescribed drive frequency when the reduction rate of at least one of the voltage of the power source detected by the voltage detection means and the voltage of the drive signal is higher than the pre-set standard reduction rate; and
   a driven component that is driven by the drive apparatus.

9. The electronic device according to claim 8, wherein the driven unit is a clock unit comprising a date display mechanism.

10. A driving method for driving an electronic device provided with a piezoelectric actuator that has a vibrating body having a piezoelectric element that vibrates due to the application of a drive signal using electrical power from a power source, said driving method comprising:
- a vibration detection step for detecting the vibration of the vibrating body and outputting a detection signal;
- a driving step for receiving the electrical power for creating the drive signal from the power source, creating a drive signal, supplying the drive signal to the piezoelectric element at a prescribed drive frequency, and supplying the drive signal to the piezoelectric element at a modified drive frequency set so that the vibration state of the vibrating body approaches the target vibration state when the vibration state detected from the detection signal differs from the target vibration state;
- a voltage detection step for detecting at least one of the voltage of the power source and the voltage of the drive signal of the piezoelectric actuator; and
- a control step for controlling the driving means so that the drive signal is set to a modified drive frequency after being temporarily set to the prescribed drive frequency when the reduction rate of at least one of the voltage of the power source detected by the voltage detection means and the voltage of the drive signal is higher than the pre-set standard reduction rate.

* * * * *